(12) United States Patent
Ender

(10) Patent No.: US 8,545,037 B2
(45) Date of Patent: Oct. 1, 2013

(54) LIGHTGUIDES HAVING LIGHT EXTRACTION STRUCTURES PROVIDING REGIONAL CONTROL OF LIGHT OUTPUT

(71) Applicant: 3M Innovative Properties Company, St. Paul, MN (US)

(72) Inventor: David Adams Ender, New Richmond, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/669,990

(22) Filed: Nov. 6, 2012

(65) Prior Publication Data
US 2013/0063980 A1    Mar. 14, 2013

Related U.S. Application Data

(63) Continuation of application No. 12/675,853, filed as application No. PCT/US2008/075018 on Sep. 2, 2008, now Pat. No. 8,322,874.

(60) Provisional application No. 60/967,623, filed on Sep. 6, 2007.

(51) Int. Cl.
*G09F 13/04* (2006.01)

(52) U.S. Cl.
USPC .......................... 362/97.1; 362/97.2; 362/602

(58) Field of Classification Search
USPC ................ 362/602, 606, 620, 577, 97.1, 97.2
See application file for complete search history.

(56) References Cited

U.S. PATENT DOCUMENTS

| | | |
|---|---|---|
| 3,018,262 A | 1/1962 | Schroeder |
| 3,729,313 A | 4/1973 | Smith |
| 3,741,769 A | 6/1973 | Smith |
| 3,779,778 A | 12/1973 | Smith |
| 3,808,006 A | 4/1974 | Smith |
| 4,249,011 A | 2/1981 | Wendling |

(Continued)

FOREIGN PATENT DOCUMENTS

| | | |
|---|---|---|
| CN | 1932555 | 3/2007 |
| EP | 841140 A2 | 5/1998 |

(Continued)

OTHER PUBLICATIONS

"Microlenslet Array Based Magnifying System," Shaoulov, Breault Research Organization, Inc., Tucson, AZ, USA, [on line], [retrieved from the internet on Feb. 7, 2011], URL <www.breault.com/resources/kbasePDF/wp_spie_026_microlenslet_array.pdf>, 8 pages. (date unknown but believed to be prior to the date of filing the priority application).

(Continued)

*Primary Examiner* — David V Bruce
(74) *Attorney, Agent, or Firm* — Daniel J. Iden

(57) ABSTRACT

Lightguides, devices incorporating lightguides, and processes for making lightguides are described. A lightguide includes light extractors arranged in a pattern on a surface of the lightguide. The pattern of light extractors is arranged to enhance uniformity of light output across a surface of the lightguide and to provide enhanced defect hiding. The efficiency of the light extractors is controlled by a shape factor. The areal density of the light extractors across the surface of the lightguide may be substantially constant or may decrease along the direction of propagation of light from the light source.

19 Claims, 13 Drawing Sheets

(56) References Cited

U.S. PATENT DOCUMENTS

| | | |
|---|---|---|
| 4,250,053 A | 2/1981 | Smith |
| 4,262,072 A | 4/1981 | Wendling |
| 4,279,717 A | 7/1981 | Eckberg |
| 4,394,403 A | 7/1983 | Smith |
| 4,491,628 A | 1/1985 | Ito |
| 4,642,126 A | 2/1987 | Zador |
| 4,652,274 A | 3/1987 | Boettcher |
| 4,668,601 A | 5/1987 | Kistner |
| 4,859,572 A | 8/1989 | Farid |
| 5,148,010 A | 9/1992 | Mori |
| 5,235,015 A | 8/1993 | Ali |
| 5,298,741 A | 3/1994 | Walt |
| 5,369,511 A | 11/1994 | Amos |
| 5,384,238 A | 1/1995 | Ellis |
| 5,512,219 A | 4/1996 | Rowland |
| 5,545,676 A | 8/1996 | Palazzotto |
| 5,718,497 A | 2/1998 | Yokoyama |
| 5,753,346 A | 5/1998 | Leir |
| 5,770,737 A | 6/1998 | Reinhardt |
| 5,856,373 A | 1/1999 | Kaisaki |
| 5,858,624 A | 1/1999 | Chou et al. |
| 5,859,251 A | 1/1999 | Reinhardt |
| 5,998,495 A | 12/1999 | Oxman |
| 6,025,406 A | 2/2000 | Oxman |
| 6,100,405 A | 8/2000 | Reinhardt |
| 6,215,095 B1 | 4/2001 | Partanen |
| 6,262,140 B1 | 7/2001 | Savant |
| 6,288,842 B1 | 9/2001 | Florczak |
| 6,316,153 B1 | 11/2001 | Goodman |
| 6,560,248 B1 | 5/2003 | Vernackt |
| 6,674,572 B1 | 1/2004 | Scheruebl |
| 6,696,157 B1 | 2/2004 | David |
| 6,713,772 B2 | 3/2004 | Goodman |
| 6,750,266 B2 | 6/2004 | Bentsen |
| 6,804,062 B2 | 10/2004 | Atwater |
| 6,852,766 B1 | 2/2005 | DeVoe |
| 6,855,478 B2 | 2/2005 | DeVoe |
| 6,949,272 B2 | 9/2005 | Wochnowski |
| 7,026,103 B2 | 4/2006 | DeVoe |
| 7,070,406 B2 | 7/2006 | Jeans |
| 7,157,145 B2 | 1/2007 | Vissing |
| 7,374,417 B2 | 5/2008 | Kuwabara |
| 7,551,359 B2 | 6/2009 | Murnan |
| 7,583,444 B1 | 9/2009 | DeVoe |
| 7,887,889 B2 | 2/2011 | David |
| 7,893,410 B2 | 2/2011 | Sykora |
| 2002/0163619 A1 | 11/2002 | Matsuzawa |
| 2002/0192569 A1 | 12/2002 | Ulland |
| 2002/0197051 A1 | 12/2002 | Tamura |
| 2003/0006535 A1 | 1/2003 | Hennessey |
| 2003/0139484 A1 | 7/2003 | Bentsen |
| 2003/0155667 A1 | 8/2003 | Devoe |
| 2003/0175525 A1 | 9/2003 | Wochnowski |
| 2004/0067431 A1 | 4/2004 | Arney |
| 2004/0145915 A1 | 7/2004 | Kim |
| 2004/0180210 A1 | 9/2004 | Vissing |
| 2004/0202865 A1 | 10/2004 | Homola |
| 2004/0223385 A1 | 11/2004 | Fleming |
| 2004/0228112 A1 | 11/2004 | Takata |
| 2005/0054744 A1 | 3/2005 | DeVoe |
| 2005/0079295 A1 | 4/2005 | Schaepkens |
| 2005/0133954 A1 | 6/2005 | Homola |
| 2005/0147918 A1 | 7/2005 | Weber |
| 2005/0254035 A1 | 11/2005 | Frankel |
| 2005/0271794 A1 | 12/2005 | DeSimone |
| 2005/0272599 A1 | 12/2005 | Kramer |
| 2005/0273146 A1 | 12/2005 | DeSimone |
| 2005/0287771 A1 | 12/2005 | Seamons |
| 2006/0046156 A1 | 3/2006 | Amako |
| 2006/0051048 A1 | 3/2006 | Gardiner |
| 2006/0157444 A1 | 7/2006 | Nakamura |
| 2006/0226566 A1 | 10/2006 | Kwak |
| 2006/0231728 A1 | 10/2006 | Takamatsu |
| 2006/0254894 A1 | 11/2006 | Jung |
| 2006/0279025 A1 | 12/2006 | Heidari |
| 2007/0018362 A1 | 1/2007 | Heidari |
| 2007/0035843 A1 | 2/2007 | Cassarly |
| 2007/0057031 A1* | 3/2007 | Lee .................... 235/145 R |
| 2007/0090278 A1 | 4/2007 | Botma |
| 2007/0102844 A1 | 5/2007 | Simon |
| 2007/0216049 A1 | 9/2007 | Rudmann |
| 2007/0217181 A1 | 9/2007 | Chiu |
| 2007/0264481 A1 | 11/2007 | DeSimone |
| 2007/0271791 A1 | 11/2007 | Lai |
| 2008/0083886 A1 | 4/2008 | Faklis |
| 2008/0106001 A1 | 5/2008 | Slafter |
| 2008/0196664 A1 | 8/2008 | David |
| 2008/0319404 A1 | 12/2008 | Pekurovsky |
| 2009/0061039 A1 | 3/2009 | Zhang |
| 2009/0099537 A1 | 4/2009 | DeVoe |
| 2009/0163127 A1 | 6/2009 | David |
| 2009/0175050 A1 | 7/2009 | Marttila |
| 2009/0213466 A1 | 8/2009 | Murnan |
| 2009/0250635 A1 | 10/2009 | Sykora |
| 2009/0279321 A1 | 11/2009 | Marttila |
| 2009/0284840 A1 | 11/2009 | Devoe |
| 2009/0285543 A1 | 11/2009 | Marttila |
| 2010/0227272 A1 | 9/2010 | DeVoe |
| 2010/0239783 A1 | 9/2010 | Mao |
| 2010/0294954 A1 | 11/2010 | Gates |
| 2010/0296106 A1 | 11/2010 | Gates |
| 2010/0308497 A1 | 12/2010 | David |
| 2010/0308509 A1 | 12/2010 | David |
| 2010/0316959 A1 | 12/2010 | Gates |
| 2011/0001950 A1 | 1/2011 | DeVoe |
| 2012/0287665 A1* | 11/2012 | Hyakuta et al. ............ 362/602 |

FOREIGN PATENT DOCUMENTS

| | | |
|---|---|---|
| EP | 856592 | 8/1998 |
| JP | 60-160017 | 8/1985 |
| JP | 11-024081 | 1/1999 |
| JP | 2001-150451 | 6/2001 |
| JP | 2004319252 | 11/2004 |
| KR | 10-2002-0088146 | 11/2002 |
| KR | 10-2007-0068852 | 7/2007 |
| TW | M298 289 | 9/2006 |
| WO | WO 98/21521 | 5/1998 |
| WO | WO 99/53242 | 10/1999 |
| WO | WO 01/96915 | 12/2001 |
| WO | WO 01/96952 | 12/2001 |
| WO | WO 01/96958 | 12/2001 |
| WO | WO 01/96961 | 12/2001 |
| WO | WO 02/05972 | 1/2002 |
| WO | WO 03/002269 | 1/2003 |
| WO | WO 2005/101466 | 10/2005 |
| WO | WO 2006/071914 | 7/2006 |
| WO | WO 2006/093963 A1 | 9/2006 |
| WO | WO 2007/051803 A1 | 5/2007 |
| WO | WO 2007/073482 A2 | 6/2007 |
| WO | WO 2007/137102 A2 | 11/2007 |

OTHER PUBLICATIONS

Allen, "193 nm Single Layer Positive Resists Building Etch Resistance Into a High Resolution Imaging System", SPIE, 1995, vol. 2438, pp. 474-485.

Allen, "High Performance Acrylic Polymers for Chemically Amplified Photoresist Applications", J. Vac. Sci. Tech. B, Nov./Dec. 1991, vol. 9, No. 6, pp. 3357-3361.

Anderson, "Close-up Imaging of Documents and Displays with Lens Arrays", Appl. Opt., Feb. 15, 1979, vol. 18, No. 4, pp. 477-484.

Baldacchini and Fourkas, "Fabrication and Metallization of Three-dimensional Microstructures", Materials Research Society Symposium Proceedings, 2004, vol. EXS-2, pp. M10.1.1-M10.1.3.

Beck, "Improving Stamps for 10 nm Level Wafer Scale Nanoimprint Lithography", Microelectr. Eng., 2002, vol. 61-62, pp. 441-448.

Beringer, "Diaryliodonium Salts. IX. The Synthesis of Substituted Diphenyliodonium Salts", J. Am. Chem. Soc., 1959, vol. 81, pp. 342-351.

Bongiovanni, "UV-curable Systems Containing Perfluoropolyether Structures: Synthesis and Characterization", Macromol. Chem. Phys., 1997, vol. 198, pp. 1893-1907.

Braun, "Polymer Replication of 3D Microstructures Employing a High Content Fluorine Separation Layer", Appl. Surf. Sci., 1999, vol. 138-139, pp. 206-211.

Chang, "A Roller Embossing Process for Rapid Fabrication of Microlens Arrays on Glass Substrates", Microsyst. Technol., Feb. 2006, vol. 12, pp. 754-759.

Dentinger, "Removal of SU-8 Photoresist for Thick Film Applications", Microelectronic Engineering, 2002, vol. 61-62, pp. 993-1000.

Duparre, "Artificial Compound Eyes—Different Concepts and Their Application to Ultra Flat Image Acquisition Sensors", MOEMS and Miniaturized Systems IV; Proceedings of SPIE, 2004, vol. 5346, pp. 89-100.

Duparre, "Microoptical Telescope Compound Eye", Optics Express, Feb. 7, 2005, vol. 13, No. 3, pp. 889-903.

Eaton, "Dye Sensitized Photopolymerization", Advances in Photochemistry, 1986, vol. 13, pp. 427-487.

Groning, "'Self-thickness-limited' Plasma Polymerization of an Ultrathin Antiadhesive Film", J. Vac. Sci. Tech. A., Nov./Dec. 1996, vol. 14, No. 6, pp. 3043-3048.

Hembd-Solner, "Imaging Properties of the Gabor Superlens", J. Opt. A: Pure Appl. Opt., 1999, vol. 1, pp. 94-102.

Hinsberg, "Effect of Resist Components on Image Spreading During Postexposure Bake of Chemically Amplified Resists", Advances in Resist Technology and Processing XVII; Proceedings of SPIE, 2000, vol. 3999, pp. 148-160.

Houle, "Antiadhesion Considerations for UV Nanoimprint Lithography", Applied Physics Letters, 2007, vol. 90, No. 213103, pp. 213103-1-213103-3.

Jaszewski, "Properties of Thin Anti-adhesive Films Used for the Replication of Microstructures in Polymers", Microelectr. Eng., 1997, vol. 35, pp. 381-384.

Jung, "Vapor-phase Self-Assembled Monolayer for Improved Mold Release in Nanoimprint Lithography", Langmuir, 2005, vol. 21, pp. 1158-1161.

Kim, "A Simple Fabrication Route to a Highly Transparent Superhydrophobic Surface with a Poly(dimethylsiloxane) Coated Flexible Mold", Chem. Commun., 2007, pp. 2237-2239.

Korner, "New Approaches in Depth-scanning Optical Metrology", Proc of SPIE, Apr. 1, 2004, vol. 5457, pp. 320-333, XP009084995.

Lafratta and Fourkas, "Direct Laser Patterning of Conductive Wires on Three-dimensional Polymeric Microstructures", Chem. Mater., 2006, vol. 18, pp. 2038-2042.

Large, "The Use of Electrochemical Potential Data in Studies of Spectral Sensitization", Photographic Sensitivity, R. J. Cox, ed., Academic Press, Chapter 15, pp. 241-264, (1973).

Lee, Handbook of Epoxy Resins, (1967).

Lee, "Antiadhesion Surface Treatments of Molds for High-Resolution Unconventional Lithography", Adv. Mater., 2006, vol. 18, pp. 3115-3119.

Lee, "Self-Assembled Monolayer as an Antiadhesion Layer on a Nickel Nanostamper in the Nanoreplication Process for Optoelectronic Applications", Applied Physics Letters, 2006, vol. 88, No. 073101, pp. 073101-1-073101-3.

Lel, "Local Thickness and Wave Velocity Measurement of Wavy Films with a Chromatic Confocal Imaging Method and a Fluorescence Intensity Technique", Experiments in Fluids, Nov. 1, 2005, vol. 39, pp. 856-864.

Li, "Multiphoton Polymerization", Materials Today, Jun. 2007, Volum 10, No. 6, pp. 30-37.

Mann, Electrochemical Reactions in Nonaqueous Systems, (1970).

Maruo, "Three-dimensional Microfabrication with Two-photon-absorbed Photopolymerization," Opt. Lett., Jan. 15, 1997, vol. 22, No. 2, pp. 132-134.

Moon, Ford, and Yang, "Fabricating Three-dimensional Polymeric Photonic Structures by Multi-beam Interference Lithography", Polymers for Advanced Technologies, Feb. 2006, vol. 17, No. 2, pp. 83-93.

Park, "Fabrication of Nano-precision PDMS Replica Using Two-photon Photopolymerization and Vacuum Pressure Difference Technique", Bull. Korean Chem. Soc., 2004, vol. 25, No. 8, pp. 1119-1120.

Peng, "High Fidelity Fabrication of Microlens Arrays by Nanoimprint Using Conformal Mold Duplication and Low-pressure Liquid Material Curing", J. Vac. Sci. Technol. B, Mar./Apr. 2007, vol. 25, No. 2, pp. 410-414.

Piestrup, "Large Area X-ray and Neutron Imaging Using Three-dimensional Arrays of Microlenses", Rev. of Sci. Inst., Nov. 2004, vol. 75, No. 11, pp. 4769-4774.

Shaoulov, "Compact Microlenslet-array-based Magnifier", Opt. Lett., Apr. 1, 2004, vol. 29, No. 7, pp. 709-711.

Shaoulov, "Magnifying Miniature Displays with Microlenslet Arrays", Helmet- and Head-Mounted Displays IX: Technologies and Applications; Proceedings of SPIE, 2004, vol. 5442, pp. 246-253.

Shi, "Chromatic Confocal Microscopy Using Supercontinuum Light", Optics Express, May 17, 2004, vol. 12, No. 10, pp. 2096-2101.

Smith, Modern Optical Engineering: The Design of Optical Systems, 1966, pp. 104-105.

Tanaka, Ishikawa and Kawata, "Two-photon-induced Reduction of Metal Ions for Fabricating Three-dimensional Electrically Conductive Metallic Microstructure", Appl. Phys. Lett., 2006, vol. 88, pp. 81107-1-81107-3.

Wang, "Polybenzoxazine as a Mold-release Agent for Nanoimprint Lithography", Langmuir, 2007, vol. 23, pp. 5868-5871.

Weinberg, Techniques of Chemistry, vol. 5, Part II, Technique of Electroorganic Synthesis, (1975).

Xu, "Measurement of Two-photon Excitation Cross Sections of Molecular Fluorophores with Data from 690 to 1050 nm", J. Optical Soc. Am. B, Mar. 1996, vol. 13, No. 3. pp. 481-491.

Zhou, "An Efficient Two-photon-Generated Photoacid Applied to Positive-tone 3D Microfabrication", Science, May 10, 2002, vol. 296, pp. 1106-1109.

International Search Report from PCT/US2008/075018; 3 pgs.

Written Opinion of the ISA for International Application No. PCT/US2008/075018, pp. 4.

* cited by examiner

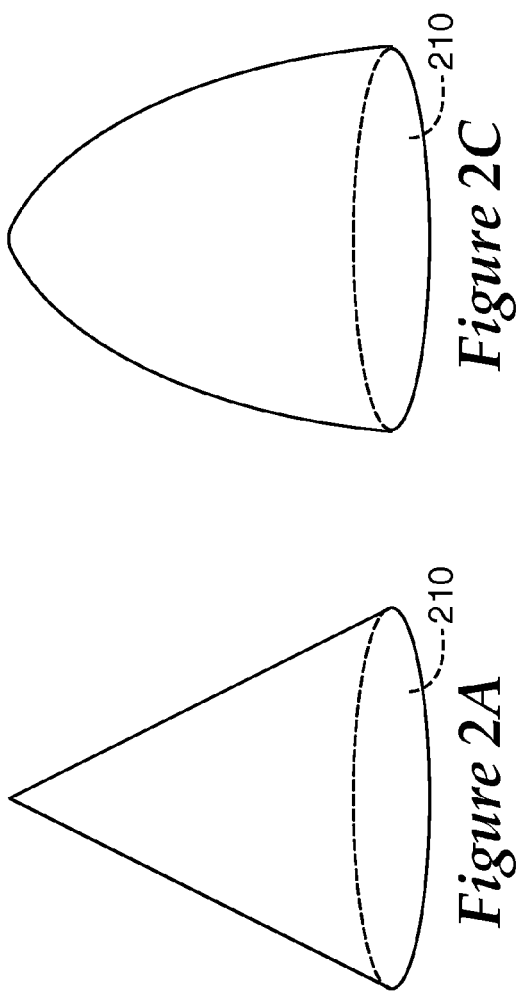
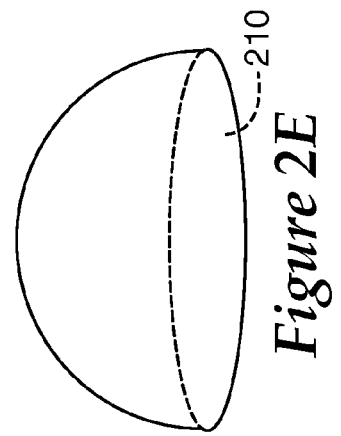
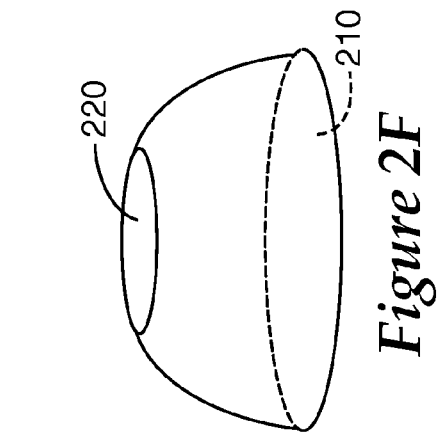
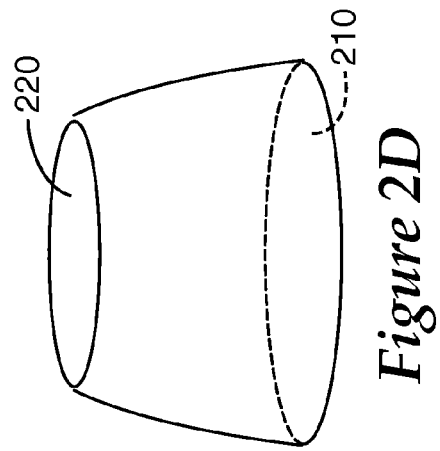
*Figure 2A*
*Figure 2B*
*Figure 2C*
*Figure 2D*
*Figure 2E*
*Figure 2F*

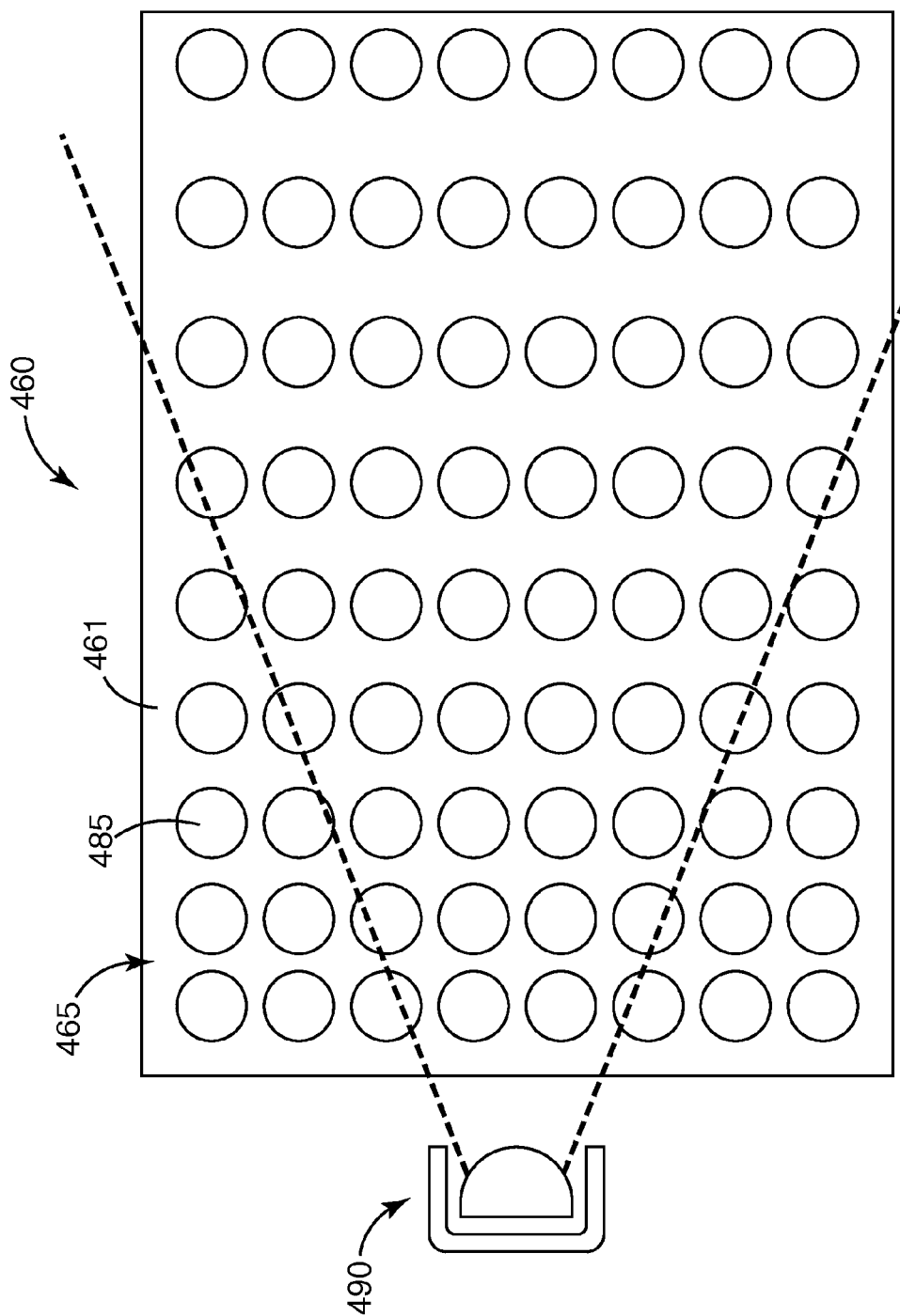

LIGHTGUIDES HAVING LIGHT EXTRACTION STRUCTURES PROVIDING REGIONAL CONTROL OF LIGHT OUTPUT

TECHNICAL FIELD

The present invention is related to lightguides, devices incorporating lightguides, and processes for making lightguides.

BACKGROUND

Many electronic devices use backlights to provide illumination for displays and other components. Backlights commonly use a lightguide that transmits light from a light source along an extent of the backlight. It is desirable for the backlight to provide substantially uniform brightness in the viewing areas with few observable defects. To soften or mask non-uniformities in brightness and other defects, a light scattering element, such as a diffuser, may be used. However, such scattering elements typically direct light away from a preferred viewing axis and require higher power output to achieve the same level of brightness.

The efficient use of light to illuminate keypads and displays is particularly important in battery powered portable devices because illumination of the device consumes a relatively large percentage of the device power budget. Light extractors have been used to extract light from lightguides and to enhance the uniformity of the lightguide brightness.

There is a need for lightguides that can enhance illumination, reduce observable defects, and/or reduce power requirements of a variety of devices. The present invention fulfills these and other needs, and offers other advantages over the prior art.

SUMMARY

Embodiments of the invention are directed to lightguides, backlights and devices incorporating lightguides, and processes for making lightguides. One embodiment of the invention is directed to a lightguide having light extractors arranged in a pattern on a surface of the lightguide. The pattern of light extractors is configured to enhance uniformity of light output across a surface of the lightguide and to decrease observable defects. An areal density of the light extractors is substantially constant or varies inversely with extraction efficiency of the light extractors.

Another embodiment of the invention involves a backlight that includes a light source and a lightguide. Light extractors are arranged in a pattern on a surface of the lightguide. The pattern of extractors is configured to enhance uniformity of light output across a surface of the lightguide. An areal density of the light extractors is substantially constant or decreases as a function of illumination from the light source.

Yet another embodiment of the invention is directed to a device having a lighted keypad. The keypad includes keys and a switch matrix arranged in relation to the keys. The key pad also includes a light source and a lightguide arranged in relation to the light source. The lightguide includes a first region configured to illuminate a first key located relatively nearer the light source and a second region configured to illuminate a second key located relatively farther from the light source. Light extractors are arranged in a pattern on a surface of the lightguide. The light extractors are configured to enhance uniformity in light output of the lightguide in the first and second regions. The light extractors have greater areal density and lower light extraction efficiency in the first region than the second region.

A further embodiment is directed to a process for making a lightguide. The process involves forming a lightguide master by providing a photoreactive composition. The photoreactive composition includes at least one reactive species that is capable of undergoing an acid- or radical-initiated chemical reaction, and at least one multiphoton photoinitiator system. At least a portion of the composition is imagewise exposed to light sufficient to cause simultaneous absorption of at least two photons, thereby inducing at least one acid- or radical-initiated chemical reaction where said composition is exposed to the light, said imagewise exposing being carried out in a pattern that is effective to define at least the surface of a pattern of light extraction structures, each light extraction structure having at least one shape factor, and the pattern of light extraction structures having a distribution that is uniform or non-uniform. The lightguide master is used to form a lightguide. At least one first region of the lightguide is configured to be located relatively nearer a light source and at least one second region of the lightguide is configured to be located relatively farther from the light source. The light extractors are arranged on a surface of the lightguide in a pattern that is configured to enhance uniformity in light output of the lightguide in the first and second regions and to enhance defect hiding in at least one of the regions. The light extractors have greater areal density and lesser extraction efficiency in the first region than in the second region.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

DESCRIPTION OF THE DRAWINGS

FIGS. 2A-2F illustrate various shapes of light extractors in accordance with embodiments of the invention;

FIG. 4C illustrates yet another lightguide configuration having a pattern of light extractors with decreasing areal density and increasing extraction efficiency as a function of illumination across the surface of the lightguide in accordance with an embodiment of the invention;

Figure 1A:
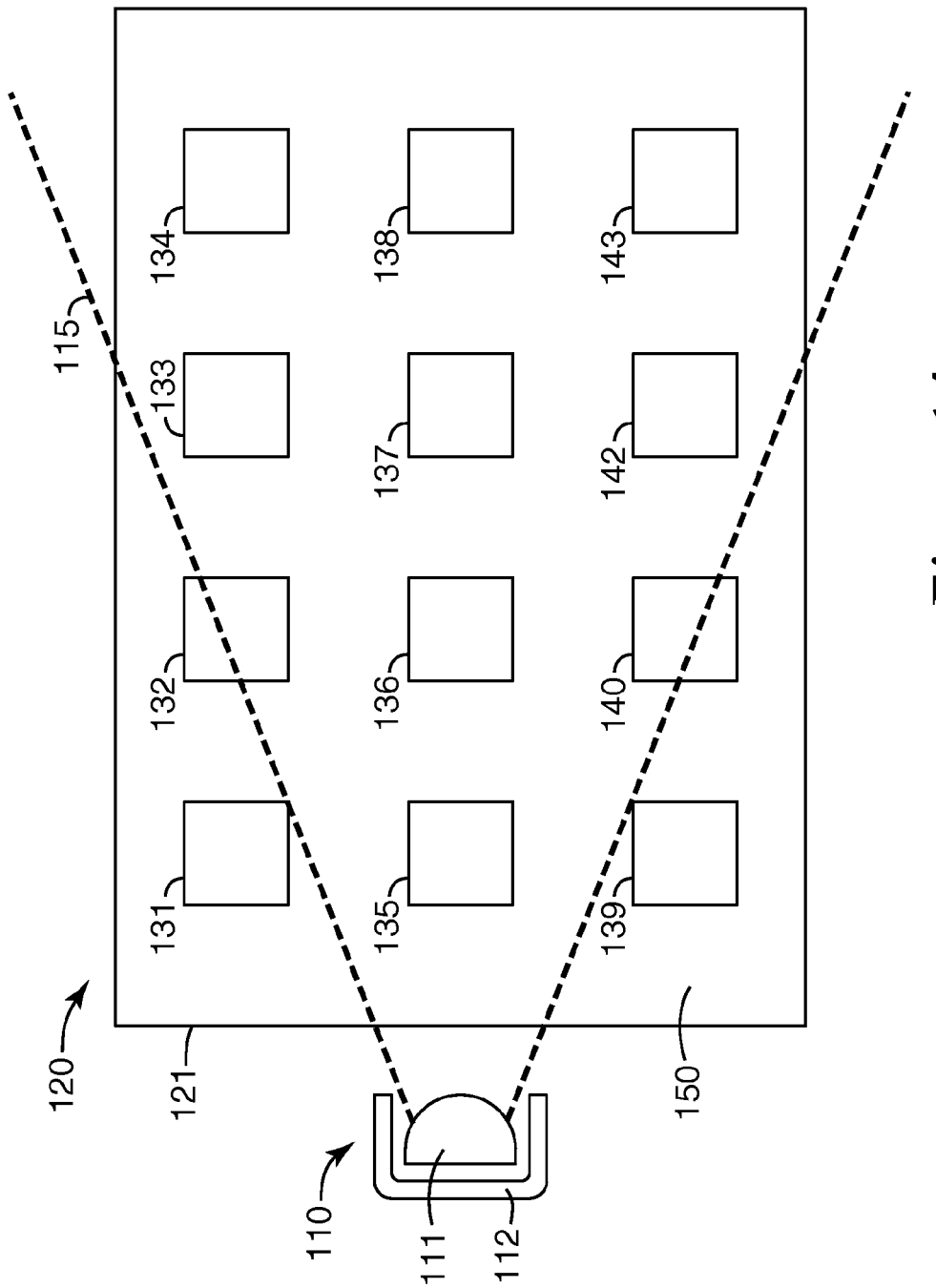
FIG. 1A illustrates a portion of an assembly including a light source arranged relative to a lightguide.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Lightguides are frequently used in backlights that illuminate displays, such as liquid crystal displays (LCDs). In display applications, it is usually desirable to maintain a uniform light output from the lightguide over the continuous display surface. Lightguides may also be used to illuminate keypads, such as the keypad of a cellphone or other portable device. In keypad applications, it is desirable for the light output to occur primarily in the regions below the keys because light output from other areas is wasted or provides less efficient illumination of the keypad. It is also desirable that the illumination of the keypad be uniform from key to key (no key visibly brighter than another) and within each key region.

Lightguides described herein include light extractor features that can be used to control light output from the lightguide to provide enhanced uniformity with fewer observable defects. Embodiments of the invention are directed to lightguides having light extractors, devices incorporating the lightguides, and processes for making the lightguides.

Edge-lit lightguides may be arranged with one or more light sources at one or more edges or corners of the lightguide. Light from the light source that is coupled into the receiving edge is confined in the lightguide by total internal reflection (TIR) as the light propagates away from the source toward a far edge of the lightguide.

Light extraction structures extract light from the lightguide and can be configured to enhance uniformity in light output across the surface of the lightguide. Without some process of controlling light extraction from the lightguide, regions of the lightguide nearer to the light source appear brighter than regions farther from the light source. Light extraction features are arranged to provide less light extraction nearer the light source and to provide more light extraction farther from the light source. In implementations that use discrete light extraction features, the light extractor pattern may be non-uniform with respect to areal density, where areal density may be determined by the number of extractors within a unit area or the size of extractors within a unit area.

Light scattering near the light source is minimal and increases as light propagates down the lightguide. The use of smaller extractors and/or a less dense pattern of extractors nearer to the light source in the regions of minimal scattering can result in observable defects in the backlight. These defects arise when the areal density of light extractors is low and the viewer is able to resolve and detect the individual extractors. A diffuser may be used to provide additional scattering that masks these observable defects, however, the use of a diffuser is undesirable because of the associated decrease in efficiency. In battery powered devices, the efficiency of the backlight is particularly important.

In lightguides in accordance with embodiments of the invention, the areal density of the light extractors may be constant across the lightguide, may decrease along the direction of propagation of the light from the light source, and/or may decrease in regions of higher illumination such as nearer the light source or within an intersecting cone of light propagating from multiple sources. These configurations are possible because variation in one or more shape factors of the individual extractors is used to control the light extraction efficiency of the extractors.

Extractor patterns in lightguide designs are constrained by a minimum fill factor required to preclude the viewer's ability to resolve and observe individual extractors. The lightguide embodiments described herein allow for higher extractor areal densities in regions close to the light source or in high illumination areas to enhance defect hiding. These configurations are possible because a shape factor of the extractors is used to provide control the extractor efficiency. By controlling the extractor efficiency through one or more shape factors, light extractor patterns with extractor areal densities above the minimum extractor fill factor are more easily achievable.

FIG. 1A illustrates an assembly including a light source 110 arranged relative to a lightguide 120. The light source 110 includes at least one lamp 111, which may be a light emitting diode (LED), a fluorescent lamp or other type of lamp, and may include a reflector 112 to direct the light emitted from the lamp 111 toward the receiving edge 121 of the lightguide 120. The light source 110 may include multiple lamps, however, in portable devices, fewer lamps are desirable to conserve battery power. Light from the lamp 111 is coupled into the lightguide 120 at the receiving edge 121. Light output from the lamp 111 may be lambertian, resulting generally in a cone 115 of light propagation through the lightguide 120. The lightguide 120 of FIG. 1A also illustrates regions 131-143 of the output surface 150. The regions 131-143 may be arranged relative to a keypad (not shown) to illuminate the keys of the keypad.

It will be appreciated, that if light extractors of the same extraction efficiency are arranged with constant areal density on the surface 150, then the light output of the lightguide 120 within the cone 115 of propagation will be greater in regions closer to the light source 110 where the light is most intense, e.g., region 135, when compared to regions farther from the light source 110, e.g., region 138, where the light is less intense. It will also be appreciated, that regions falling partially or fully outside the cone 115 of propagation, such as regions 131, 132, 139, and 140, will suffer from decreased light output even though these regions are relatively close to the light source 110. It is beneficial to use controlled efficiency for light extraction across the output surface 150 of the lightguide 120 to compensate for variable light input, thereby enhancing uniformity of light output across the output surface 150.

Figure 1B:
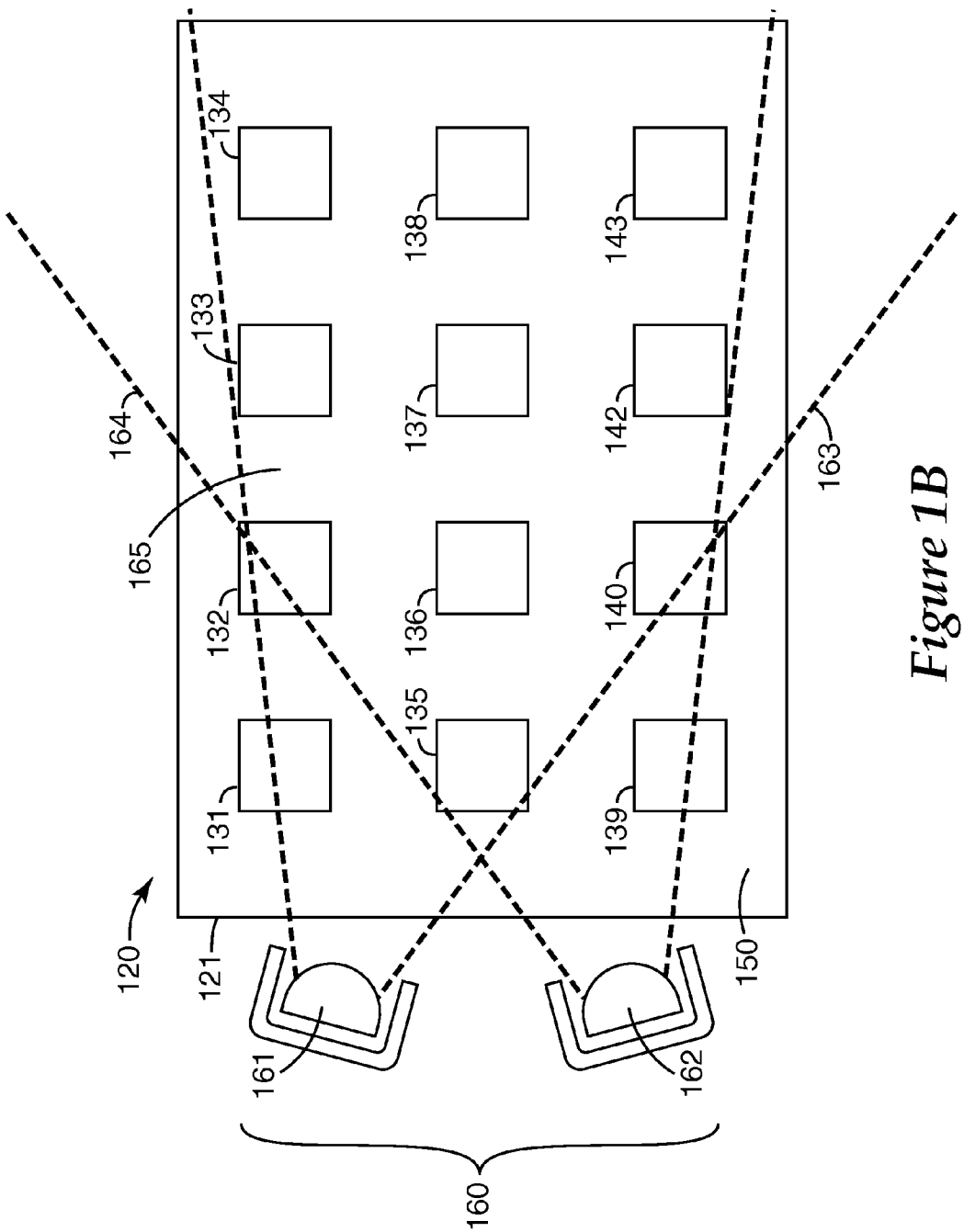
FIG. 1B illustrates a portion of an assembly that includes a multiple lamp light source arranged relative to the lightguide.

FIG. 1B illustrates a portion of a backlight subsystem that includes a multiple lamp light source 160 arranged relative to the lightguide 120. The light source 160 includes lamp A 161 and lamp B 162. Light from lamps A and B 161, 162 is coupled into the lightguide 120 at the receiving edge 121 of the lightguide 120. Light output from lamp A 161 produces a first cone 163 of light propagation and the light output from lamp B 162 produces a second cone 164 of light propagation. The lightguide 120 of FIG. 1B also illustrates regions 131-143 of the lightguide output surface 150 that may be arranged relative to a keypad to illuminate the keys of the keypad. In some embodiments of the invention, as illustrated in FIG. 1B, one or more of the lamps 161, 162 may be oriented at an angle with respect to the receiving edge 121 of the lightguide 120 to better distribute the light and achieve more uniform flux in the lightguide 120.

If light extractors of the same extraction efficiency are arranged in a pattern with constant areal density on the surface, then the light output of the lightguide 120 within a region, e.g., region 135, that is closest to at least one of the lamps 161, 162 and within the intersection 165 of the first and second cones 163, 164 would be expected to have highest light output. Light output in regions that are positioned farther from the lamps, such as regions 134, 138, and 143, or in regions that fall partially or fully outside the intersection 165 of the first and second cones 163, 164, such as regions 131, 132, 139, and 140, would be expected to have a lower light output. Regions 131 and 139 that are positioned partially or fully outside of both the first and the second cones of propagation 163, 164 would have lower light output even though they are closer to the light source 160.

Figure 1C:
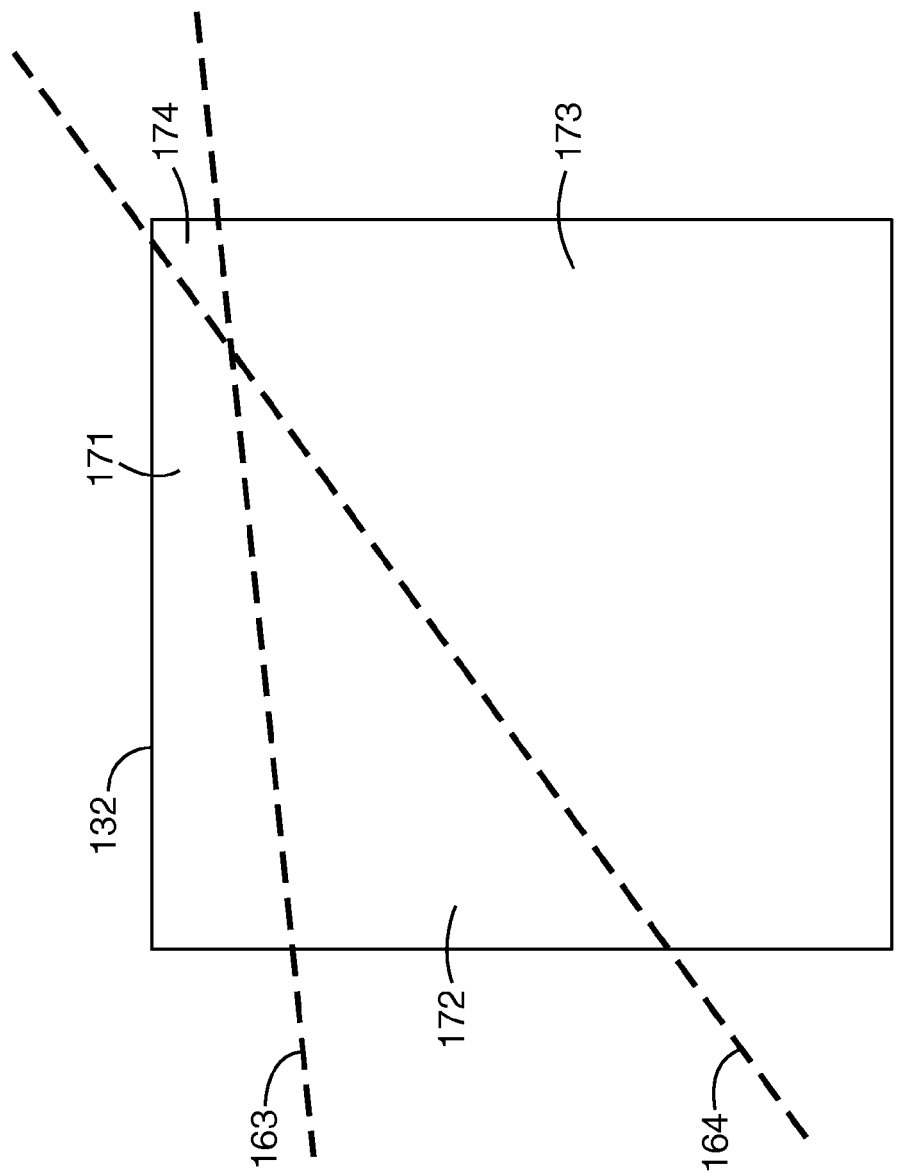
FIG. 1C illustrates the variation of light within a region of a lightguide.

The light output may also vary within a region, as illustrated by the close up view of region 132 in FIG. 1C. FIG. 1C illustrates that region 132 may be divided into subregions 171-174 according to the light input to the subregions which is propagated from the light source 160 to region 132. The subregions 171-174 include subregion 172 which is within the first cone 163 of propagation from the light source 160, but not the second cone 164; subregion 174 which is within the second cone 164 but not the first cone 163; subregion 173 which is within both cones 163, 164; and subregion 171 which is outside both of the propagation cones 163, 164. Light extractors having the same efficiency arranged with constant areal density would not produce uniform light output from this region due to the variation in light input to the various subregions 171-174. It is desirable to provide controlled light extraction to enhance uniform light output from regions having uneven light input from the source, such as region 132.

Lightguides having light extractors in accordance with embodiments of the invention may be used to provide enhanced uniformity of light output across the surface of the lightguide or within particular regions of the lightguide. Masters used to fabricate the light extractors described herein may be formed using a multi-photon photolithographic process which is described below and as described more fully in commonly owned U.S. Provisional Application Ser. No. 60/747,609, filed May 18, 2006, which is incorporated by reference.

The light extractors described herein may be formed in a variety of sizes, geometric shapes, and surface profiles, including, for example, both protruding and recessed structures. The light extractors may be formed so that variation in at least one shape factor, such as height and/or tilt angle, controls light extraction efficiency of the light extractor. Height of the extractor is the height along the principle axis of the extractor from the center of the extractor base to the center of the extractor top. Tilt angle is the angle between the principal axis and the base.

Light extractors in accordance with embodiments of the invention may have the same base footprint on a lightguide but have varying amounts of extraction efficiency depending on the shape factors. Varying the shape factors to control efficiency of light extraction allows light extractor patterns that provide enhanced uniformity of light output over the surface or within regions of the lightguide, and also provide enhanced defect hiding. In various lightguide embodiments that provide enhanced uniformity and/or defect hiding, the areal density of the light extractors is above a certain minimal fill factor, such as above a fill factor of about 28%, or more preferably, a fill factor of about 33%. Below this minimal fill factor, the viewer may be able to resolve and observe the individual light extractors, which is undesirable.

In lightguides in accordance with embodiments of the invention, the areal density may be constant across the lightguide, or may decrease along the direction of propagation of the light from the light source, and/or may decrease in regions of higher illumination such as nearer the light source or within an intersecting cone of light propagation from multiple sources. These configurations are possible because variation in one or more shape factors of the individual extractors is used to control the light extraction efficiency of the extractors. As discussed above, extractor patterns in lightguide designs are constrained by the minimum fill factor required to preclude the viewers' ability to resolve and observe individual extractors. The lightguide embodiments described herein allow for higher extractor areal densities in regions close to the light source or in high illumination areas to enhance defect hiding. These configurations are possible because a shape factor is controlled to provide decreased extractor efficiency in these areas. By controlling the extractor efficiency through one or more shape factors, light extractor patterns with extractor areal densities above the minimum extractor fill factor are more easily achievable.

Light extraction structures fabricated using the multi-photon process advantageously allow the areal density of the light extractors to be increased or remain constant and above the minimum fill factor in regions nearest the light source to provide both enhanced uniformity in light output and reduction of observable defects near the light source.

The multi-photon process allows light extractors with controlled efficiency through variation of shape factors to be constructed. A lightguide master may be formed using the two-photon process having an array of light extractor structures which may be protruding or recessed structures of heights (or depths in the case of recessed structures) in the range of about 5 microns to about 300 microns, about 50 to about 200 microns, or about 75 to about 150 microns, and/or maximum lengths and/or maximum widths in the range of about 5 microns to about 500 microns, about 50 to about 300 microns, or about 100 to about 300 microns. A wide range of fill factors (up to 100 percent) may be achieved. For many applications, fill factors of about 1 percent to about 100 percent, or about 5 percent to about 75 percent can be useful. Preferably, fill factors are above about 28% to preclude viewer observation of the individual extractors. A monolithic lightguide bearing the light extractor pattern of the master may be fabricated from the master.

Figure 2G:
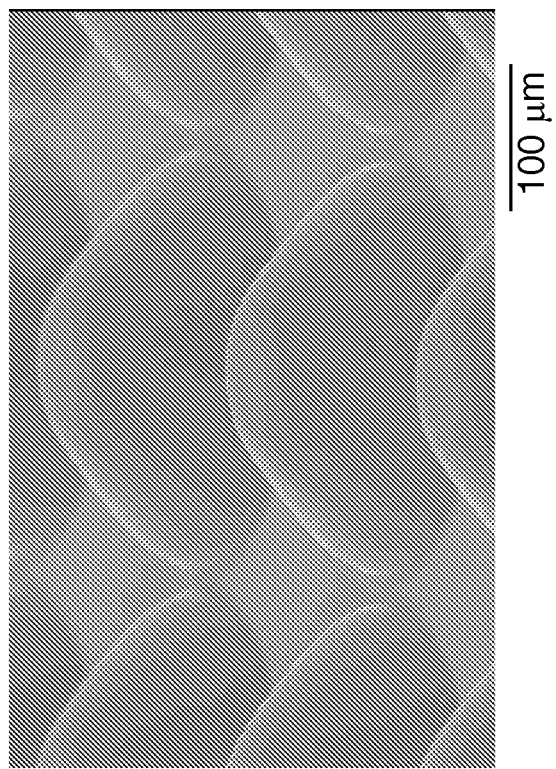
FIG. 2G is a scanning electron micrograph of a light extractor array on a lightguide in accordance with an embodiment of the invention.

As illustrated in FIGS. 2A-2F, the light extractors in accordance with various embodiments may have asymmetrical or symmetrical geometric configurations, such as cones (FIG. 2A), or aspheres (FIG. 2E), including parabolic (FIG. 2C) or hyperbolic structures, truncated cones (FIG. 2B) or truncated aspheres (FIG. 2F), including truncated parabolic (FIG. 2D) or hyperbolic structures, and combinations thereof. Truncated configurations have both a base 210 and a truncation that can form a planar top surface 220 as illustrated in FIG. 2B. The configurations can be complex (for example, combining segments of multiple shapes in a single structure such as the stacked combination of an asphere and a cone or a pyramid). Light extractors of any shape may be arranged in an array as illustrated by the scanning electron micrograph of FIG. 2G.

Figure 3A:
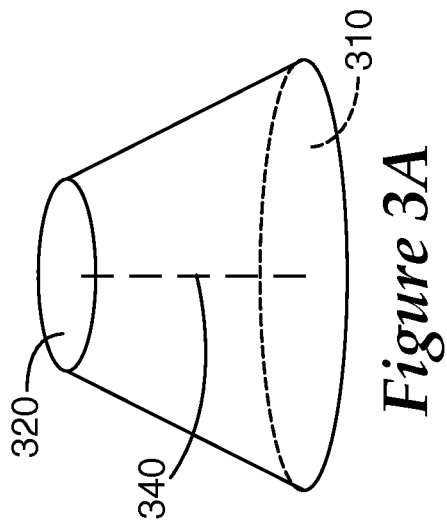
FIGS. 3A and 3B illustrate shape features that may be used to control the efficiency of light extraction in accordance with embodiments of the invention.
Figure 3B:
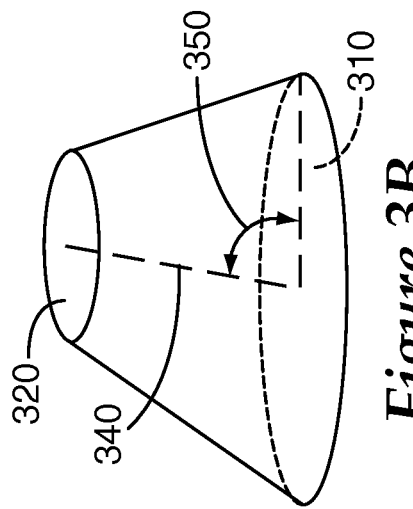

As illustrated in FIG. 3A, geometric configurations of the light extractors may comprise such elements as a base 310, one or more faces 330, for example, that form a sidewall, and a top 320, which may be a planar surface formed by truncation, or may be a point, for example. The elements of the light extractors may take on essentially any shape. For example, bases, faces, and tops can be circular, elliptical, polygonal (regular or irregular), and the resulting sidewalls can be characterized by a vertical cross section (taken perpendicular to the base) that is parabolic, hyperbolic, linear, or a combination thereof. Preferably the side wall is not perpendicular to the base of the structure. For example, the sidewalls may have vertical tangent angles at the base of about 10 degrees to about 80 degrees. As previously discussed, the light extractors have a principle axis 340 connecting the center of the base 310 to the center of the top 320. The tilt angle 350 of the extractors, illustrated in FIG. 3B, is the angle between the principle axis 340 and the base 310. The tilt angle 350 may be up to about 80 degrees depending upon the desired brightness and field of view.

The shape factors, e.g., height and/or tilt angle, of the extractors on a lightguide surface may be may be varied to control brightness and uniformity. For example, the light extractors can be arranged in a pattern so that these shape factors of the light extractors vary according to the distance of the extractor from the light source, or according to the illumination of the extractor position by the light source. The variation of the shape factors may be used to produce a desired uniformity in light output across the entire surface of the lightguide or within specific regions of the lightguide. The pattern of light extractors may be regular or random, and may have a generally uniform areal density or may have a non-uniform areal density that decreases with illumination, for example.

Figure 4A:
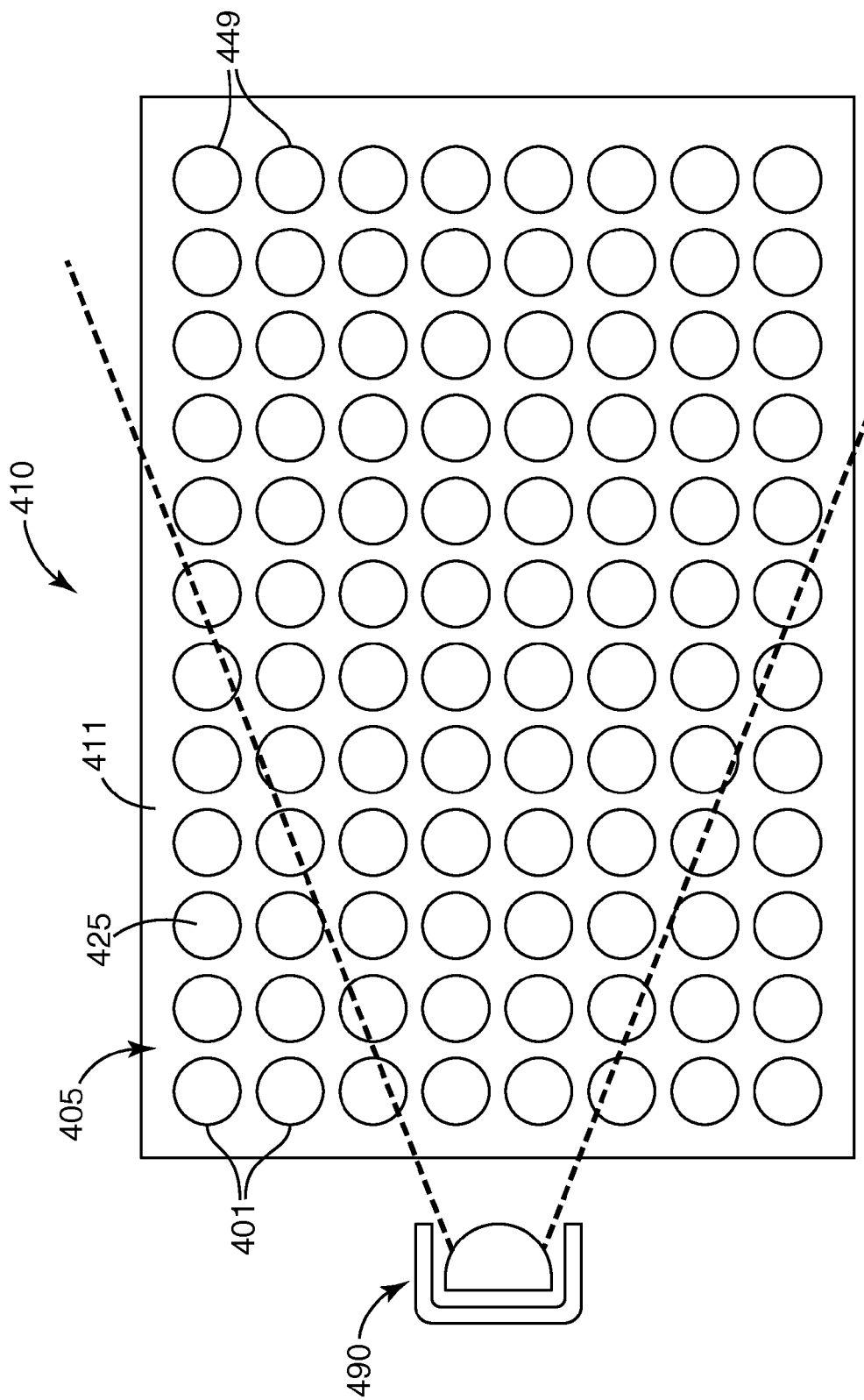
FIG. 4A is a top view of a lightguide having a pattern of light extractors with substantially uniform spacing across the surface of the lightguide in accordance with an embodiment of the invention.

FIG. 4A is a top view of a lightguide 410 having a pattern 405 of light extractors with substantially uniform spacing across the surface 411 of the lightguide 410. The light extractors have substantially the same size base footprint 425 but a varying shape factor. This configuration represents a light extractor pattern that has constant areal density across the surface of the lightguide but provides uniformity of light output despite the closer proximity of some regions of the lightguide to the light source. The light extractor pattern 405 provides constant areal density and increasing extraction efficiency of the light extractors as a function of distance from the light source 490. The extraction efficiency of the light extractors may decrease with illumination of the extractor position by the light source 490.

The light extractors of FIG. 4A are fabricated so that at least one shape factor, such as height or tilt angle, which controls the extraction efficiency of the light extractors, varies with distance from the light source 490 or illumination by the light source to enhance the uniformity of the light output. Thus, the light extractors 401 closer to the light source 490 are less efficient at extracting light from the lightguide than the light extractors 449 farthest from the light source 490. Through the control of light extractor efficiency via the shape factor, the various lightguide configurations described herein can control the uniformity of light output to less than about +/−10%.

Figure 4B:
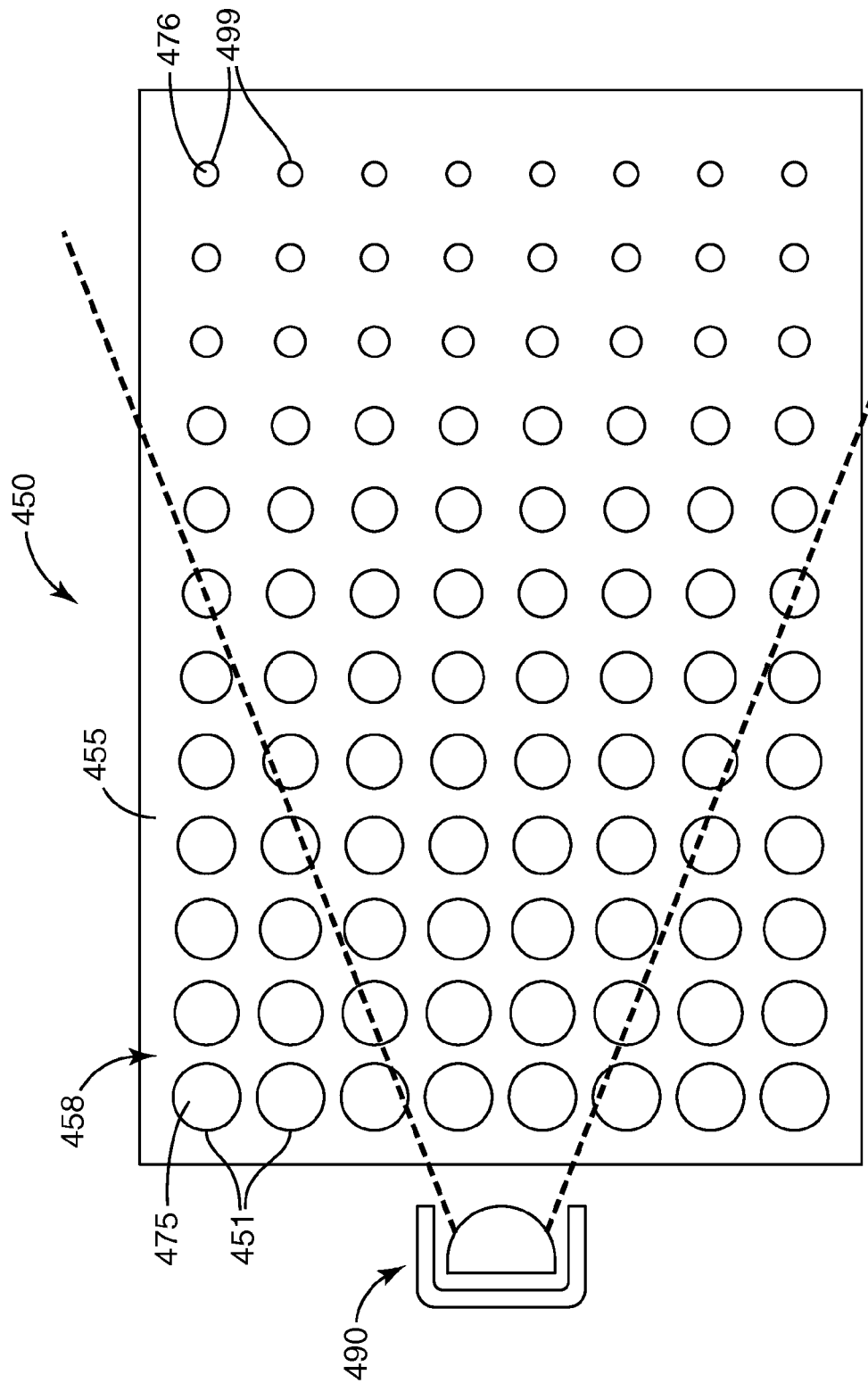
FIG. 4B illustrates a lightguide configuration having a pattern of light extractors that generally have decreasing areal density and increasing extraction efficiency across the lightguide surface in accordance with an embodiment of the invention.

The lightguide configuration of FIG. 4B illustrates a pattern 455 of light extractors that generally have decreasing areal density and increasing extraction efficiency as a result of a varying shape factor across the lightguide surface 455. In this configuration, the areal density of the light extractors decreases in the direction of propagation of the light from the light source 490. The extraction efficiency of the light extractors increases as a function of distance from the light source and decreases as a function of footprint size in this embodiment. For example, the light extractors 499 farther from the light source have a smaller base footprint 476 and higher extraction efficiency when compared to light extractors 451 that have a base footprint 475 and which are closer to the light source 490. The higher areal density of the light extractors closer to the light source provides enhanced defect hiding where it is generally most needed.

FIG. 4C illustrates yet another lightguide configuration 460 having a pattern 465 of light extractors with decreasing areal density above the minimal fill factor and increasing extraction efficiency as a function of illumination across the surface 461 of the lightguide 460. In this configuration, each of the light extractors has substantially the same base footprint 485 on the surface 461 of the lightguide 460. The areal density of the light extractors decreases as a function of distance from or illumination by the light source 490. For example, in lightguide configurations as illustrated in FIG. 4C, where the illumination of the lightguide 460 by the light source decreases along the direction of propagation of light, the areal density of the light extractors may decrease and the extraction efficiency may increase along the direction of propagation of light. The light extractors are fabricated so that at least one shape factor, such as height or tilt angle varies with illumination by the light source to control extraction efficiency to enhance the uniformity of the light output. As previously discussed, the higher areal density of the extractors closer to the light source provides enhanced defect hiding.

Figure 5A:
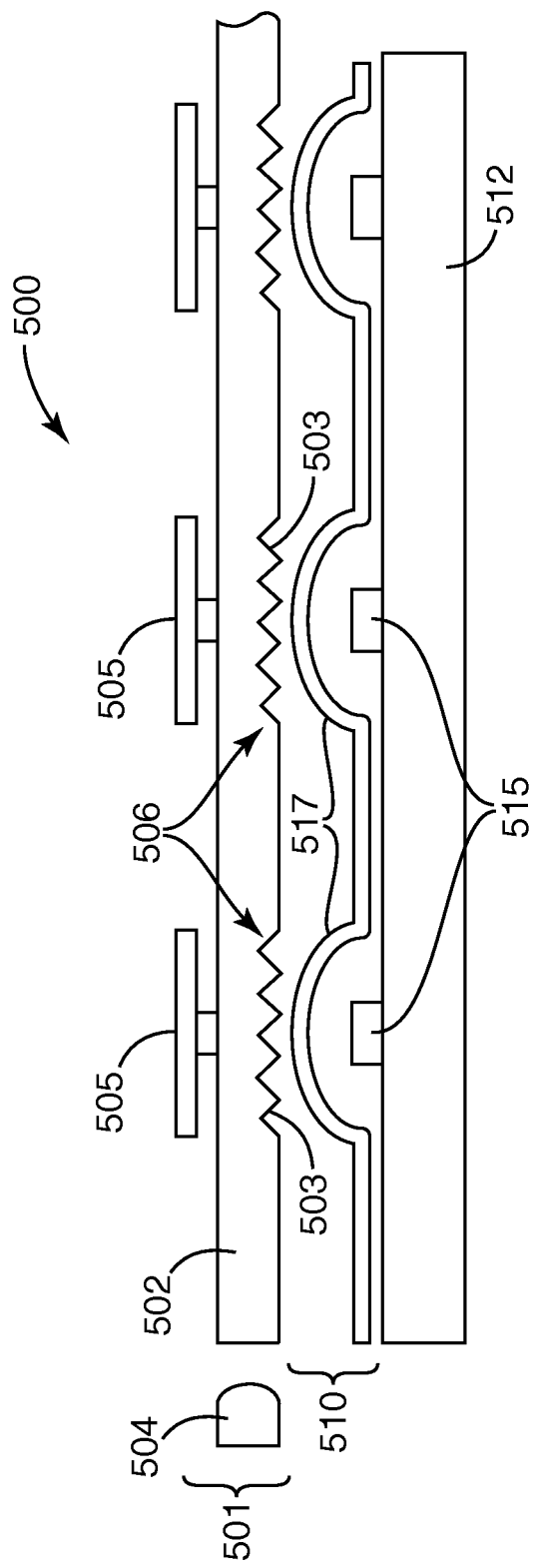
FIG. 5A is a cross sectional view of a keypad having a lightguide with light extractors for key illumination in accordance with embodiments of the invention.

Lightguides incorporating extractors fabricated in accordance with embodiments of the invention are particularly useful in illuminating keys of a keypad. The light extractors can be used to control the light output between and/or within the regions associated with the keys of the keypad. A cross sectional view of a keypad 500 is illustrated in FIG. 5A. The keypad 500 includes a light source 504 and lightguide 502 with light extractors 503 located in regions 506 below the keys 505. The entire surface of the keys 505, or portions of the keys 505, may be illuminated by the lightguide 502. In some configuration, the keys 505 are identified by numbers, letters, or other indicia that are lighted. A matrix 510 of switches aligned with the keys 505 is mounted on a printed circuit board 512. The switch matrix 510 includes electrically conductive switch contacts 515 disposed on the printed circuit board 512 and electrically conductive domed contacts 517 arranged above the switch contacts 515. When a key 505 is depressed, the force is transferred through the lightguide 502 to the domed contact 517 under the key. The lightguide is a thin, planar structure made of a material that is sufficiently flexible to withstand numerous key depressions without breaking. Suitable materials for the lightguide which provide sufficient flexibility are described in U.S. Provisional Patent Application Ser. No. 60/747,609 which has been previously incorporated herein. The domed contact 517 flexes to make electrical contact with its corresponding switch contact 515 on the printed circuit board 512.

Figure 5B:
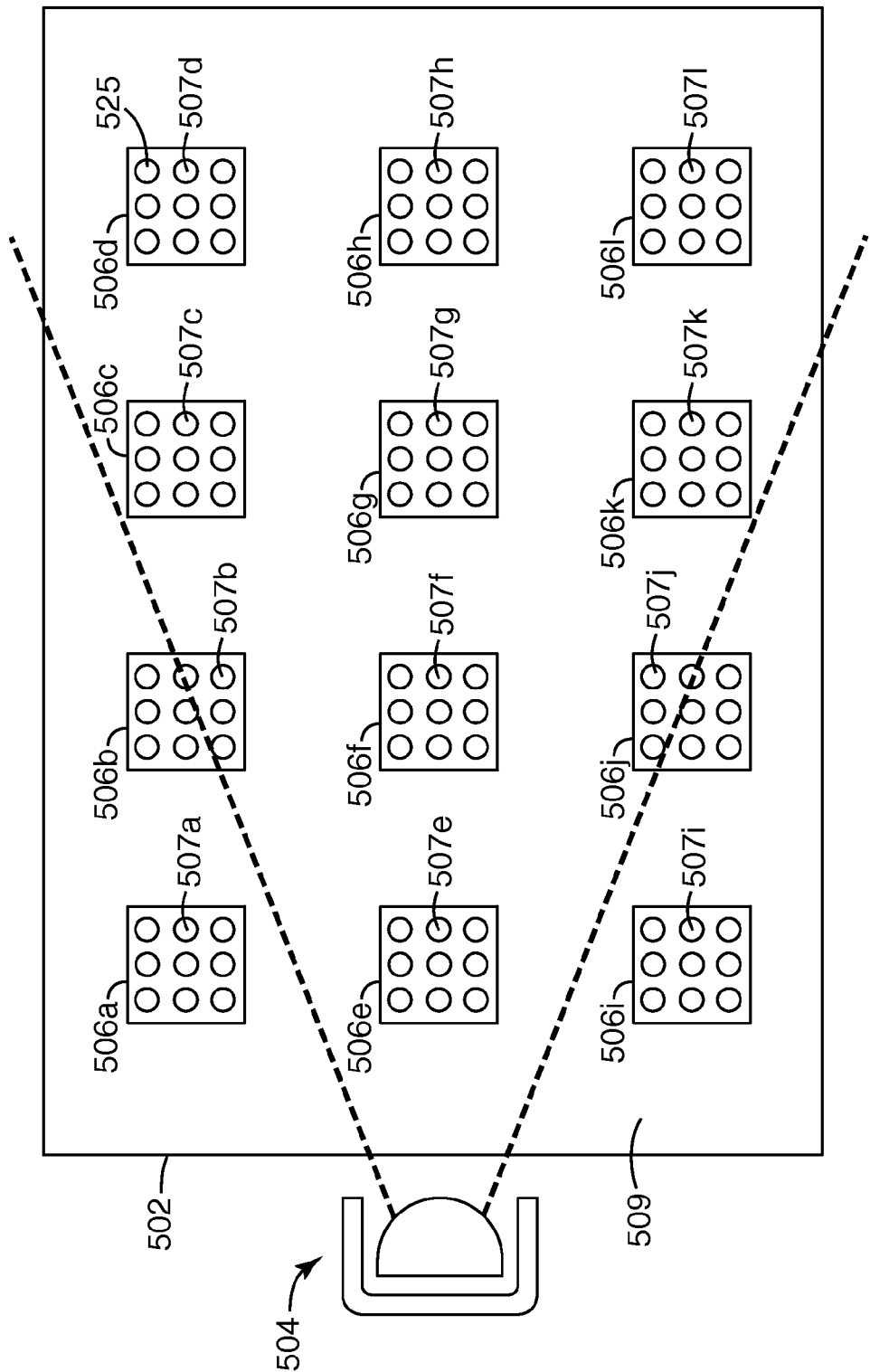
FIGS. 5B and 5C are top views of two configurations of a lightguide used to illuminate the keys of a keypad in accordance with embodiments of the invention.

FIG. 5B is a top view of the light source 504 and lightguide 502 of FIG. 5A illustrating the regions 506a-506l located below the keys 505. The keys 505, which are not shown in FIG. 5B, are primarily illuminated by light output from these regions 506. Thus, it is desirable to maximize light output in the key regions 506 and to minimize the light output in the surrounding regions 509 that do not serve to illuminate the keys. Further, it is desirable and to provide uniform illumination across each key region 506 and from region to region (i.e., from key to key).

The regions 506 of the lightguide 502 of FIG. 5B include groups of light extractors 507 that that have uniform areal density in each of the regions 506. Each of the light extractors has substantially the same size base footprint 525. This configuration represents a light extractor pattern that has constant areal density in each of the regions 506 but provides uniformity of light output despite the closer proximity of some regions 506 of the lightguide 502 to the light source 504. The light extractor pattern in the regions 506 provides constant areal density and increasing extraction efficiency of the light extractors 507a-507l as a function of distance from the light source 504. The efficiency of the extractors varies inversely with illumination by the light source 504.

The light extractors of FIG. 5B are fabricated so that at least one shape factor, such as height or tilt angle, which controls the extraction efficiency of the light extractors 507, varies with distance from the light source 504 or illumination by the light source 504 to enhance the uniformity of the light output. Thus, the light extractors that are closer to the light source 504 or are more illuminated by the light source 504 (light extractors 507e) are less efficient at extracting light from the lightguide 502 than the light extractors that are farther from the light source 504 (light extractors 507d or 507l) or are less illuminated by the light source, (light extractors 507a and 507i). The ability to control the efficiency of the light extractors through varying shape factors allows for lightguide designs that have increased areal extractor density close the light source which advantageously provides enhanced defect hiding.

Figure 5C:
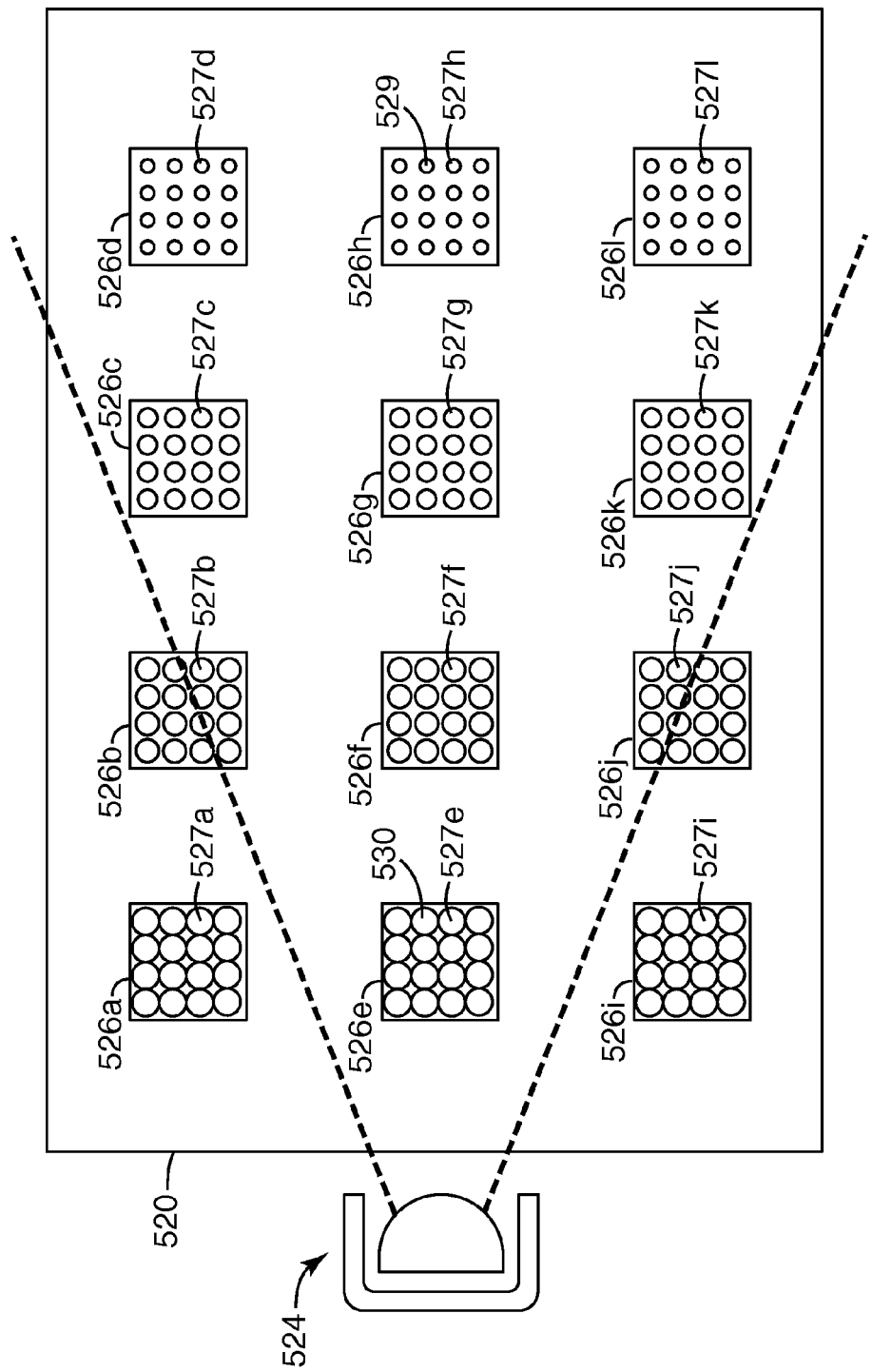

The lightguide configuration of FIG. 5C illustrates a lightguide 520 having regions 526a-526l configured to be located below the keys of a keypad. Each of the regions 526a-526l includes light extractors 527a-527l, respectively. The light extractors 527a-527l generally have decreasing areal density and increasing extraction efficiency across the surface of lightguide 520. In this configuration, the areal density of the light extractors 527a-527l decreases in the direction of propagation of the light from the light source 524. The extraction efficiency of the light extractors increases as a function of distance from the light source and decreases as a function of illumination by the light source. For example, light extractors farther from the light source, e.g., light extractors 527h have a smaller base footprint 529 and higher extraction efficiency than the light extractors closer to the light source 504, e.g., light extractors 527e.

As previously discussed, different levels of illumination from the light source may be present within a region, making it desirable to equalize the light output within a region as well as from region to region. FIG. 1C illustrates a situation where a region is not uniformly illuminated by a light source. This non-uniformity in illumination from the light source may be compensated for through the use of extractors that have a corresponding, inverse non-uniformity in extraction efficiency.

The light extractors in accordance with embodiments of the invention may be used to enhance uniformity of the light output within a region that illuminates a key by controlling the extraction efficiency of the extractors in the region. For example, light extractors having lowest efficiency may be positioned where the illumination from the light source is highest. The extraction efficiency of the light extractors within a region may vary according to the amount of illumination experienced by the light extractors.

A replication tool may be used to fabricate the lightguides described herein. The replication tool, which may comprise metal, silicon, or other suitable materials comprises the negative of the lightguide features including the protruded or recessed light extractors. The metal replication tool may be made from a master by electroplating or electroforming the metal, such as nickel, against the master and subsequently removing the master. A silicone replication tool can be made by curing a silicone resin against the master and subsequently removing the master.

The masters may be formed using a multi-photon photolithographic process which is described in commonly owned U.S. Provisional Application 60/747,609, which has been incorporated by reference. The multi-photon photolithographic process involves imagewise exposing at least a portion of a photoreactive composition to light sufficient to cause simultaneous absorption of at least two photons, thereby inducing at least one acid- or radical-initiated chemical reaction where the composition is exposed to the light, the imagewise exposing being carried out in a pattern that is effective to define at least the surface of a plurality of light extraction structures.

Reactive Species

Reactive species suitable for use in the photoreactive compositions include both curable and non-curable species. Curable species are generally preferred and include, for example, addition-polymerizable monomers and oligomers and addition-crosslinkable polymers (such as free-radically polymerizable or crosslinkable ethylenically-unsaturated species including, for example, acrylates, methacrylates, and certain vinyl compounds such as styrenes), as well as cationically-polymerizable monomers and oligomers and cationically-crosslinkable polymers (which species are most commonly acid-initiated and which include, for example, epoxies, vinyl ethers, cyanate esters, etc.), and the like, and mixtures thereof.

Suitable ethylenically-unsaturated species are described, for example, by Palazzotto et al. in U.S. Pat. No. 5,545,676 at column 1, line 65, through column 2, line 26, and include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, trishydroxyethyl-isocyanurate trimethacrylate, the bis-acrylates and bis-methacrylates of polyethylene glycols of molecular weight about 200-500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like;

and mixtures thereof. Suitable reactive polymers include polymers with pendant (meth)acrylate groups, for example, having from 1 to about 50 (meth)acrylate groups per polymer chain. Examples of such polymers include aromatic acid (meth)acrylate half ester resins such as Sarbox™ resins available from Sartomer (for example, Sarbox™ 400, 401, 402, 404, and 405). Other useful reactive polymers curable by free radical chemistry include those polymers that have a hydrocarbyl backbone and pendant peptide groups with free-radically polymerizable functionality attached thereto, such as those described in U.S. Pat. No. 5,235,015 (Ali et al.). Mixtures of two or more monomers, oligomers, and/or reactive polymers can be used if desired. Preferred ethylenically-unsaturated species include acrylates, aromatic acid (meth)acrylate half ester resins, and polymers that have a hydrocarbyl backbone and pendant peptide groups with free-radically polymerizable functionality attached thereto.

Suitable cationically-reactive species are described, for example, by Oxman et al. in U.S. Pat. Nos. 5,998,495 and 6,025,406 and include epoxy resins. Such materials, broadly called epoxides, include monomeric epoxy compounds and epoxides of the polymeric type and can be aliphatic, alicyclic, aromatic, or heterocyclic. These materials generally have, on the average, at least 1 polymerizable epoxy group per molecule (preferably, at least about 1.5 and, more preferably, at least about 2). The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendant epoxy groups (for example, a glycidyl methacrylate polymer or copolymer). The epoxides can be pure compounds or can be mixtures of compounds containing one, two, or more epoxy groups per molecule. These epoxy-containing materials can vary greatly in the nature of their backbone and substituent groups. For example, the backbone can be of any type and substituent groups thereon can be any group that does not substantially interfere with cationic cure at room temperature. Illustrative of permissible substituent groups include halogens, ester groups, ethers, sulfonate groups, siloxane groups, nitro groups, phosphate groups, and the like. The molecular weight of the epoxy-containing materials can vary from about 58 to about 100,000 or more.

Other epoxy-containing materials that are useful include glycidyl ether monomers of the formula

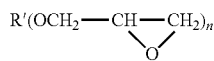

where R' is alkyl or aryl and n is an integer of 1 to 8. Examples are glycidyl ethers of polyhydric phenols obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in *Handbook of Epoxy Resins*, Lee and Neville, McGraw-Hill Book Co., New York (1967).

A number of commercially available epoxy monomers or resins can be used. Epoxides that are readily available include, but are not limited to, octadecylene oxide; epichlorohydrin; styrene oxide; vinylcyclohexene oxide; glycidol; glycidyl methacrylate; diglycidyl ethers of bisphenol A (for example, those available under the trade designations "EPON 815C", "EPON 813", "EPON 828", "EPON 1004F", and "EPON 1001F" from Hexion Specialty Chemicals, Inc., Columbus, Ohio); and diglycidyl ether of bisphenol F (for example, those available under the trade designations "ARALDITE GY281" from Ciba Specialty Chemicals Holding Company, Basel, Switzerland, and "EPON 862" from Hexion Specialty Chemicals, Inc.). Other aromatic epoxy resins include the SU-8 resins available from MicroChem. Corp., Newton, Mass.

Other exemplary epoxy monomers include vinyl cyclohexene dioxide (available from SPI Supplies, West Chester, Pa.); 4-vinyl-1-cylcohexene diepoxide (available from Aldrich Chemical Co., Milwaukee, Wis.); 3,4-epoxycyclohexylmethyl-3,4-epoxycyclohexene carboxylate (for example, one available under the trade designation "CYRACURE UVR-6110" from Dow Chemical Co., Midland, Mich.); 3,4-epoxy-6-methylcylcohexylmethyl-3,4-epoxy-6-methyl-cylcohexane carboxylate; 2-(3,4-epoxycyclohexyl-5,5-spiro-3,4-epoxy)cyclohexane-metadioxane; bis(3,4-epoxycyclohexylmethyl)adipate (for example, one available under the trade designation "CYRACURE UVR-6128" from Dow Chemical Co.); bis(3,4-epoxy-6-methylclyclohexylmethyl)adipate; 3,4-epoxy-6-methylcyclohexane carboxylate; and dipentene dioxide.

Still other exemplary epoxy resins include epoxidized polybutadiene (for example, one available under the trade designation "POLY BD 605E" from Sartomer Co., Inc., Exton, Pa.); epoxy silanes (for example, 3,4-epoxycyclcohexylethyltrimethoxysilane and 3-glycidoxypropyltrimethoxysilane, commercially available from Aldrich Chemical Co., Milwaukee, Wis.); flame retardant epoxy monomers (for example, one available under the trade designation "DER-542", a brominated bisphenol type epoxy monomer available from Dow Chemical Co., Midland, Mich.); 1,4-butanediol diglycidyl ether (for example, one available under the trade designation "ARALDITE RD-2" from Ciba Specialty Chemicals); hydrogenated bisphenol A-epichlorohydrin based epoxy monomers (for example, one available under the trade designation "EPONEX 1510" from Hexion Specialty Chemicals, Inc.); polyglycidyl ether of phenol-formaldehyde novolak (for example, one available under the trade designation "DEN-431" and "DEN-438" from Dow Chemical Co.); and epoxidized vegetable oils such as epoxidized linseed and soybean oils available under the trade designations "VIKOLOX" and "VIKOFLEX" from Atofina Chemicals (Philadelphia, Pa.).

Additional suitable epoxy resins include alkyl glycidyl ethers commercially available from Hexion Specialty Chemicals, Inc. (Columbus, Ohio) under the trade designation "HELOXY". Exemplary monomers include "HELOXY MODFIER 7" (a $C_8$-$C_{10}$ alky glycidyl ether), "HELOXY MODIFIER 8" (a $C_{12}$-$C_{14}$ alkyl glycidyl ether), "HELOXY MODIFIER 61" (butyl glycidyl ether), "HELOXY MODIFIER 62" (cresyl glycidyl ether), "HELOXY MODIFIER 65" (p-tert-butylphenyl glycidyl ether), "HELOXY MODIFIER 67" (diglycidyl ether of 1,4-butanediol), "HELOXY 68" (diglycidyl ether of neopentyl glycol), "HELOXY MODIFIER 107" (diglycidyl ether of cyclohexanedimethanol), "HELOXY MODIFIER 44" (trimethylol ethane triglycidyl ether), "HELOXY MODIFIER 48" (trimethylol propane triglycidyl ether), "HELOXY MODIFIER 84" (polyglycidyl ether of an aliphatic polyol), and "HELOXY MODIFIER 32" (polyglycol diepoxide).

Other useful epoxy resins comprise copolymers of acrylic acid esters of glycidol (such as glycidyl acrylate and glycidyl methacrylate) with one or more copolymerizable vinyl compounds. Examples of such copolymers are 1:1 styrene-glycidyl methacrylate and 1:1 methyl methacrylate-glycidyl acrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Useful epoxy-functional polymers include epoxy-functional silicones such as those described in U.S. Pat. No. 4,279,717 (Eckberg et al.), which are commercially available from the General Electric Company. These are polydimethylsiloxanes in which 1-20 mole % of the silicon atoms have been substituted with epoxyalkyl groups (preferably, epoxy cyclohexylethyl, as described in U.S. Pat. No. 5,753,346 (Leir et al.).

Blends of various epoxy-containing materials can also be utilized. Such blends can comprise two or more weight average molecular weight distributions of epoxy-containing compounds (such as low molecular weight (below 200), intermediate molecular weight (about 200 to 1000), and higher molecular weight (above about 1000)). Alternatively or additionally, the epoxy resin can contain a blend of epoxy-containing materials having different chemical natures (such as aliphatic and aromatic) or functionalities (such as polar and non-polar). Other cationically-reactive polymers (such as vinyl ethers and the like) can additionally be incorporated, if desired.

Preferred epoxies include aromatic glycidyl epoxies (for example, the EPON resins available from Hexion Specialty Chemicals, Inc. and the SU-8 resins available from Micro-Chem. Corp., Newton, Mass., including XP KMPR 1050 strippable SU-8), and the like, and mixtures thereof. More preferred are the SU-8 resins and mixtures thereof.

Suitable rationally-reactive species also include vinyl ether monomers, oligomers, and reactive polymers (for example, methyl vinyl ether, ethyl vinyl ether, tert-butyl vinyl ether, isobutyl vinyl ether, triethyleneglycol divinyl ether (RAPI-CURE DVE-3, available from International Specialty Products, Wayne, N.J.), trimethylolpropane trivinyl ether, and the VECTOMER divinyl ether resins from Morflex, Inc., Greensboro, N.C. (for example, VECTOMER 1312, VECTOMER 4010, VECTOMER 4051, and VECTOMER 4060 and their equivalents available from other manufacturers)), and mixtures thereof. Blends (in any proportion) of one or more vinyl ether resins and/or one or more epoxy resins can also be utilized. Polyhydroxy-functional materials (such as those described, for example, in U.S. Pat. No. 5,856,373 (Kaisaki et al.)) can also be utilized in combination with epoxy- and/or vinyl ether-functional materials.

Non-curable species include, for example, reactive polymers whose solubility can be increased upon acid- or radical-induced reaction. Such reactive polymers include, for example, aqueous insoluble polymers bearing ester groups that can be converted by photogenerated acid to aqueous soluble acid groups (for example, poly(4-tert-butoxycarbonyloxystyrene). Non-curable species also include the chemically-amplified photoresists described by R. D. Allen, G. M. Wallraff, W. D. Hinsberg, and L. L. Simpson in "High Performance Acrylic Polymers for Chemically Amplified Photoresist Applications," J. Vac. Sci. Technol. B, 9, 3357 (1991). The chemically-amplified photoresist concept is now widely used for microchip manufacturing, especially with sub-0.5 micron (or even sub-0.2 micron) features. In such photoresist systems, catalytic species (typically hydrogen ions) can be generated by irradiation, which induces a cascade of chemical reactions. This cascade occurs when hydrogen ions initiate reactions that generate more hydrogen ions or other acidic species, thereby amplifying reaction rate. Examples of typical acid-catalyzed chemically-amplified photoresist systems include deprotection (for example, t-butoxycarbonyloxystyrene resists as described in U.S. Pat. No. 4,491,628, tetrahydropyran (THP) methacrylate-based materials, THP-phenolic materials such as those described in U.S. Pat. No. 3,779,778, t-butyl methacrylate-based materials such as those described by R. D Allen et al. in Proc. SPIE 2438, 474 (1995), and the like); depolymerization (for example, polyphthaldehyde-based materials); and rearrangement (for example, materials based on the pinacol rearrangements).

If desired, mixtures of different types of reactive species can be utilized in the photoreactive compositions. For example, mixtures of free-radically-reactive species and cationically-reactive species are also useful.

Photoinitiator System

The photoinitiator system is a multiphoton photoinitiator system, as the use of such a system enables polymerization to be confined or limited to the focal region of a focused beam of light. Such a system preferably is a two- or three-component system that comprises at least one multiphoton photosensitizer, at least one photoinitiator (or electron acceptor), and, optionally, at least one electron donor. Such multi-component systems can provide enhanced sensitivity, enabling photoreaction to be effected in a shorter period of time and thereby reducing the likelihood of problems due to movement of the sample and/or one or more components of the exposure system.

Preferably, the multiphoton photoinitiator system comprises photochemically effective amounts of (a) at least one multiphoton photosensitizer that is capable of simultaneously absorbing at least two photons and that, optionally but preferably, has a two-photon absorption cross-section greater than that of fluorescein; (b) optionally, at least one electron donor compound different from the multiphoton photosensitizer and capable of donating an electron to an electronic excited state of the photosensitizer; and (c) at least one photoinitiator that is capable of being photosensitized by accepting an electron from an electronic excited state of the photosensitizer, resulting in the formation of at least one free radical and/or acid.

Alternatively, the multiphoton photoinitiator system can be a one-component system that comprises at least one photoinitiator. Photoinitiators useful as one-component multi-photon photoinitiator systems include acyl phosphine oxides (for example, those sold by Ciba under the trade name Irgacure™ 819, as well as 2,4,6 trimethyl benzoyl ethoxyphenyl phosphine oxide sold by BASF Corporation under the trade name Lucirin™ TPO-L) and stilbene derivatives with covalently attached sulfonium salt moieties (for example, those described by W. Zhou et al. in Science 296, 1106 (2002)). Other conventional ultraviolet (UV) photoinitiators such as benzil ketal can also be utilized, although their multi-photon photoinitiation sensitivities will generally be relatively low.

Multiphoton photosensitizers, electron donors, and photoinitiators (or electron acceptors) useful in two- and three-component multiphoton photoinitiator systems are described below.

(1) Multiphoton Photosensitizers

Multiphoton photosensitizers suitable for use in the multiphoton photoinitiator system of the photoreactive compositions are those that are capable of simultaneously absorbing at least two photons when exposed to sufficient light. Preferably, the photosensitizers have a two-photon absorption cross-section greater than that of fluorescein (that is, greater than that of 3',6'-dihydroxyspiro[isobenzofuran-(3H), 9'-[9H]xanthen]3-one). Generally, the preferred cross-section can be greater than about $50 \times 10^{-50}$ cm$^4$ sec/photon, as measured by the method described by C. Xu and W. W. Webb in J. Opt. Soc. Am. B, 13, 481 (1996) (which is referenced by Marder and Perry et al. in International Publication No. WO 98/21521 at page 85, lines 18-22).

More preferably, the two-photon absorption cross-section of the photosensitizer is greater than about 1.5 times that of fluorescein (or, alternatively, greater than about $75\times10^{-50}$ $cm^4$ sec/photon, as measured by the above method); even more preferably, greater than about twice that of fluorescein (or, alternatively, greater than about $100\times10^{-50}$ $cm^4$ sec/photon); most preferably, greater than about three times that of fluorescein (or, alternatively, greater than about $150\times10^{-50}$ $cm^4$ sec/photon); and optimally, greater than about four times that of fluorescein (or, alternatively, greater than about $200\times10^{-50}$ $cm^4$ sec/photon).

Preferably, the photosensitizer is soluble in the reactive species (if the reactive species is liquid) or is compatible with the reactive species and with any binders (as described below) that are included in the composition. Most preferably, the photosensitizer is also capable of sensitizing 2-methyl-4,6-bis(trichloromethyl)-s-triazine under continuous irradiation in a wavelength range that overlaps the single photon absorption spectrum of the photosensitizer (single photon absorption conditions), using the test procedure described in U.S. Pat. No. 3,729,313.

Preferably, a photosensitizer can also be selected based in part upon shelf stability considerations. Accordingly, selection of a particular photosensitizer can depend to some extent upon the particular reactive species utilized (as well as upon the choices of electron donor compound and/or photoinitiator).

Particularly preferred multiphoton photosensitizers include those exhibiting large multiphoton absorption cross-sections, such as Rhodamine B⁻ (that is, N-[9-(2-carboxyphenyl)-6-(diethylamino)-3H-xanthen-3-ylidene]-N-ethyl-ethanaminium chloride or hexafluoroantimonate) and the four classes of photosensitizers described, for example, by Marder and Perry et al. in International Patent Publication Nos. WO 98/21521 and WO 99/53242. The four classes can be described as follows: (a) molecules in which two donors are connected to a conjugated π (pi)-electron bridge; (b) molecules in which two donors are connected to a conjugated π (pi)-electron bridge which is substituted with one or more electron accepting groups; (c) molecules in which two acceptors are connected to a conjugated π (pi)-electron bridge; and (d) molecules in which two acceptors are connected to a conjugated π (pi)-electron bridge which is substituted with one or more electron donating groups (where "bridge" means a molecular fragment that connects two or more chemical groups, "donor" means an atom or group of atoms with a low ionization potential that can be bonded to a conjugated π (pi)-electron bridge, and "acceptor" means an atom or group of atoms with a high electron affinity that can be bonded to a conjugated π (pi)-electron bridge).

The four above-described classes of photosensitizers can be prepared by reacting aldehydes with ylides under standard Wittig conditions or by using the McMurray reaction, as detailed in International Patent Publication No. WO 98/21521.

Other compounds are described by Reinhardt et al. (for example, in U.S. Pat. Nos. 6,100,405, 5,859,251, and 5,770,737) as having large multiphoton absorption cross-sections, although these cross-sections were determined by a method other than that described above.

Preferred photosensitizers include the following compounds (and mixtures thereof):

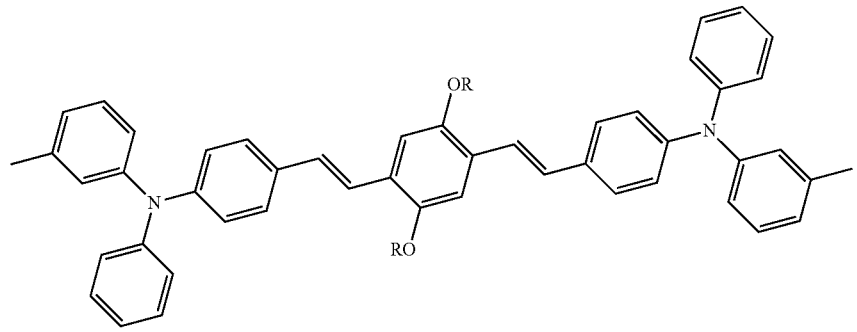

R = $C_{12}H_{25}$

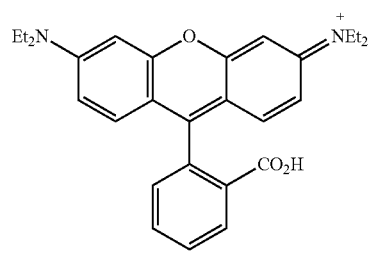

X⁻ where X⁻ = Cl⁻, $PF_6^-$, $SbF_6^-$, $AsF_6^-$, $BF_4^-$, $CF_3SO_3^-$

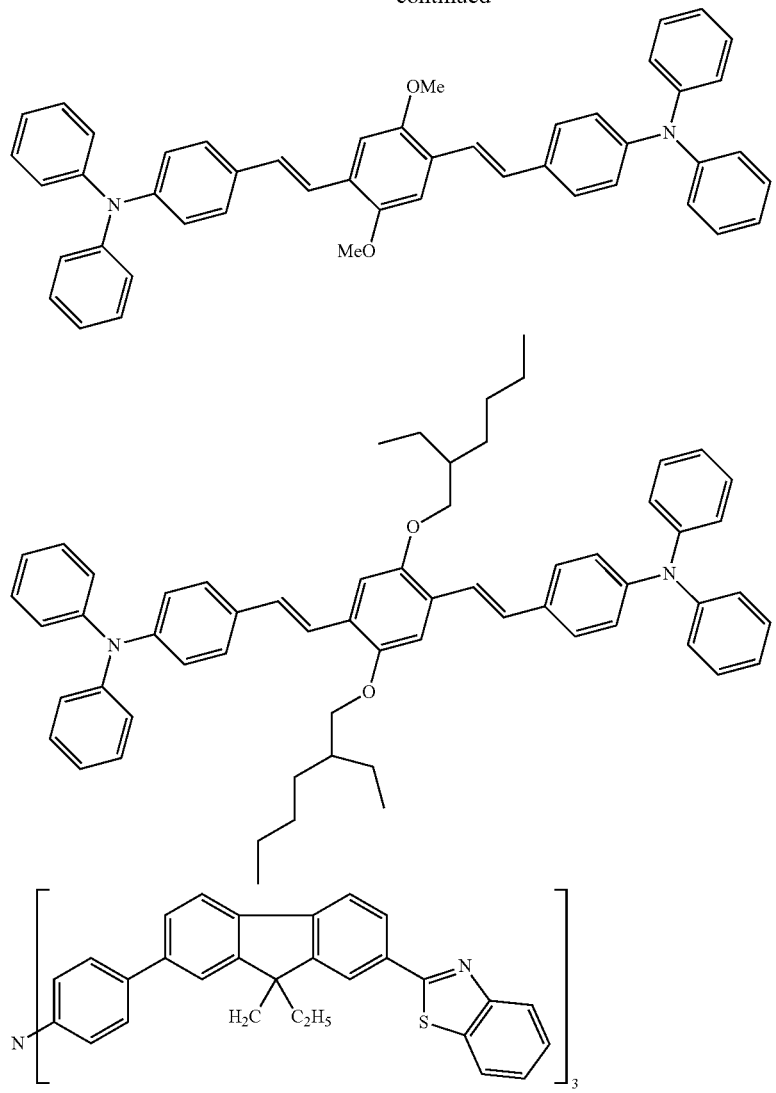

(2) Electron Donor Compounds

Electron donor compounds useful in the multiphoton photoinitiator system of the photoreactive compositions are those compounds (other than the photosensitizer itself) that are capable of donating an electron to an electronic excited state of the photosensitizer. Such compounds may be used, optionally, to increase the multiphoton photosensitivity of the photoinitiator system, thereby reducing the exposure required to effect photoreaction of the photoreactive composition. The electron donor compounds preferably have an oxidation potential that is greater than zero and less than or equal to that of p-dimethoxybenzene. Preferably, the oxidation potential is between about 0.3 and 1 volt vs. a standard saturated calomel electrode ("S.C.E.").

The electron donor compound is also preferably soluble in the reactive species and is selected based in part upon shelf stability considerations (as described above). Suitable donors are generally capable of increasing the speed of cure or the image density of a photoreactive composition upon exposure to light of the desired wavelength.

When working with cationically-reactive species, those skilled in the art will recognize that the electron donor compound, if of significant basicity, can adversely affect the cationic reaction. (See, for example, the discussion in U.S. Pat. No. 6,025,406 (Oxman et al.) at column 7, line 62, through column 8, line 49.)

In general, electron donor compounds suitable for use with particular photosensitizers and photoinitiators can be selected by comparing the oxidation and reduction potentials of the three components (as described, for example, in U.S. Pat. No. 4,859,572 (Farid et al.)). Such potentials can be measured experimentally (for example, by the methods described by R. J. Cox, *Photographic Sensitivity*, Chapter 15, Academic Press (1973)) or can be obtained from references such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970). The potentials reflect relative energy relationships and can be used to guide electron donor compound selection.

Suitable electron donor compounds include, for example, those described by D. F. Eaton in *Advances in Photochemistry*, edited by B. Voman et al., Volume 13, pp. 427-488, John Wiley and Sons, New York (1986); by Oxman et al. in U.S.

Pat. No. 6,025,406 at column 7, lines 42-61; and by Palazzotto et al. in U.S. Pat. No. 5,545,676 at column 4, line 14 through column 5, line 18. Such electron donor compounds include amines (including triethanolamine, hydrazine, 1,4-diazabicyclo[2.2.2]octane, triphenylamine (and its triphenylphosphine and triphenylarsine analogs), aminoaldehydes, and aminosilanes), amides (including phosphoramides), ethers (including thioethers), ureas (including thioureas), sulfinic acids and their salts, salts of ferrocyanide, ascorbic acid and its salts, dithiocarbamic acid and its salts, salts of xanthates, salts of ethylene diamine tetraacetic acid, salts of $(alkyl)_n(aryl)_m$borates (n+m=4) (tetraalkylammonium salts preferred), various organometallic compounds such as $SnR_4$ compounds (where each R is independently chosen from among alkyl, aralkyl (particularly, benzyl), aryl, and alkaryl groups) (for example, such compounds as $n-C_3H_7Sn(CH_3)_3$, $(allyl)Sn(CH_3)_3$, and (benzyl)$Sn(n-C_3H_7)_3$), ferrocene, and the like, and mixtures thereof. The electron donor compound can be unsubstituted or can be substituted with one or more non-interfering substituents. Particularly preferred electron donor compounds contain an electron donor atom (such as a nitrogen, oxygen, phosphorus, or sulfur atom) and an abstractable hydrogen atom bonded to a carbon or silicon atom alpha to the electron donor atom.

Preferred amine electron donor compounds include alkyl-, aryl-, alkaryl- and aralkyl-amines (for example, methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethyl-aminophenethanol and p-N-dimethylaminobenzonitrile); aminoaldehydes (for example, p-N,N-dimethylaminobenzaldehyde, p-N,N-diethylaminobenzaldehyde, 9-julolidine carboxaldehyde, and 4-morpholinobenzaldehyde); and aminosilanes (for example, trimethylsilylmorpholine, trimethylsilylpiperidine, bis(dimethylamino)diphenylsilane, tris(dimethylamino)methylsilane, N,N-diethylaminotrimethylsilane, tris(dimethylamino)phenylsilane, tris(methylsilyl)amine, tris(dimethylsilyl)amine, bis(dimethylsilyl)amine, N,N-bis(dimethylsilyl)aniline, N-phenyl-N-dimethylsilylaniline, and N,N-dimethyl-N-dimethylsilylamine); and mixtures thereof. Tertiary aromatic alkylamines, particularly those having at least one electron-withdrawing group on the aromatic ring, have been found to provide especially good shelf stability. Good shelf stability has also been obtained using amines that are solids at room temperature. Good photosensitivity has been obtained using amines that contain one or more julolidinyl moieties.

Preferred amide electron donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide, tripiperidinophosphine oxide, and mixtures thereof.

Preferred alkylarylborate salts include
$Ar_3B^-(n-C_4H_9)N^+(C_2H_5)_4$
$Ar_3B^-(n-C_4H_9)N^+(CH_3)_4$
$Ar_3B^-(n-C_4H_9)N^+(n-C_4H_9)_4$
$Ar_3B^-(n-C_4H_9)Li^+$
$Ar_3B^-(n-C_4H_9)N^+(C_6H_{13})_4$
$Ar_3B^-(C_4H_9)N^+(CH_3)_3(CH_2)_2CO_2(CH_2)_2CH_3$
$Ar_3B^-(C_4H_9)N^+(CH_3)_3(CH_2)_2OCO(CH_2)_2CH_3$
$Ar_3B^-(sec-C_4H_9)N^+(CH_3)_3(CH_2)_2CO_2(CH_2)_2CH_3$
$Ar_3B^-(sec-C_4H_9)N^+(C_6H_{13})_4$
$Ar_3B^-(C_4H_9)N^+(C_6H_{17})_4$
$Ar_3B^-(C_4H_9)N^+(CH_3)_4$
$(p-CH_3O-C_6H_4)_3B^-(n-C_4H_9)N^+(n-C_4H_9)_4$
$Ar_3B^-(C_4H_9)N^+(CH_3)_3(CH_2)_2OH$
$ArB^-(n-C_4H_9)_3N^+(CH_3)_4$
$ArB^-(C_2H_5)_3N^+(CH_3)_4$
$Ar_2B^-(n-C_4H_9)_2N^+(CH_3)_4$
$Ar_3B^-(C_4H_9)N^+(C_4H_9)_4$
$Ar_4B^-N^+(C_4H_9)_4$
$ArB^-(CH_3)_3N^+(CH_3)_4$
$(n-C_4H_9)_4B^- N^+(CH_3)_4$
$Ar_3B^-(C_4H_9)P^+(C_4H_9)_4$ (where Ar is phenyl, naphthyl, substituted (preferably, fluoro-substituted) phenyl, substituted naphthyl, and like groups having greater numbers of fused aromatic rings), as well as tetramethylammonium n-butyltriphenylborate and tetrabutylammonium n-hexyl-tris(3-fluorophenyl)borate, and mixtures thereof.

Suitable ether electron donor compounds include 4,4'-dimethoxybiphenyl, 1,2,4-trimethoxybenzene, 1,2,4,5-tetramethoxybenzene, and the like, and mixtures thereof. Suitable urea electron donor compounds include N,N'-dimethylurea, N,N-dimethylurea, N,N'-diphenylurea, tetramethylthiourea, tetraethylthiourea, tetra-n-butylthiourea, N,N-di-n-butylthiourea, N,N'-di-n-butylthiourea, N,N-diphenylthiourea, N,N'-diphenyl-N,N'-diethylthiourea, and the like, and mixtures thereof.

Preferred electron donor compounds for free radical-induced reactions include amines that contain one or more julolidinyl moieties, alkylarylborate salts, and salts of aromatic sulfinic acids. However, for such reactions, the electron donor compound can also be omitted, if desired (for example, to improve the shelf stability of the photoreactive composition or to modify resolution, contrast, and reciprocity). Preferred electron donor compounds for acid-induced reactions include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile, 4-dimethylaminophenethyl alcohol, and 1,2,4-trimethoxybenzene.

(3) Photoinitiators

Suitable photoinitiators (that is, electron acceptor compounds) for the reactive species of the photoreactive compositions are those that are capable of being photosensitized by accepting an electron from an electronic excited state of the multiphoton photosensitizer, resulting in the formation of at least one free radical and/or acid. Such photoinitiators include iodonium salts (for example, diaryliodonium salts), sulfonium salts (for example, triarylsulfonium salts optionally substituted with alkyl or alkoxy groups, and optionally having 2,2' oxy groups bridging adjacent aryl moieties), and the like, and mixtures thereof.

The photoinitiator is preferably soluble in the reactive species and is preferably shelf-stable (that is, does not spontaneously promote reaction of the reactive species when dissolved therein in the presence of the photosensitizer and the electron donor compound). Accordingly, selection of a particular photoinitiator can depend to some extent upon the particular reactive species, photosensitizer, and electron donor compound chosen, as described above. If the reactive species is capable of undergoing an acid-initiated chemical reaction, then the photoinitiator is an onium salt (for example, an iodonium or sulfonium salt).

Suitable iodonium salts include those described by Palazzotto et al. in U.S. Pat. No. 5,545,676 at column 2, lines 28 through 46. Suitable iodonium salts are also described in U.S. Pat. Nos. 3,729,313, 3,741,769, 3,808,006, 4,250,053 and 4,394,403. The iodonium salt can be a simple salt (for example, containing an anion such as Cl⁻, Br⁻, I⁻ or $C_4H_5SO_3^-$) or a metal complex salt (for example, containing $SbF_6^-$, $PF_6^-$, $BF_4^-$, tetrakis(perfluorophenyl)borate, $SbF_5OH^-$ or $AsF_6^-$). Mixtures of iodonium salts can be used if desired.

Examples of useful aromatic iodonium complex salt photoinitiators include diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl)iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl)iodonium hexafluorophosphate; di(4-bromophenyl)iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate; and the like; and mixtures thereof. Aromatic iodonium complex salts can be prepared by metathesis of corresponding aromatic iodonium simple salts (such as, for example, diphenyliodonium bisulfate) in accordance with the teachings of Beringer et al., J. Am. Chem. Soc. 81, 342 (1959).

Preferred iodonium salts include diphenyliodonium salts (such as diphenyliodonium chloride, diphenyliodonium hexafluorophosphate, and diphenyliodonium tetrafluoroborate), diaryliodonium hexafluoroantimonate (for example, SarCat™ SR 1012 available from Sartomer Company), and mixtures thereof.

Useful sulfonium salts include those described in U.S. Pat. No. 4,250,053 (Smith) at column 1, line 66, through column 4, line 2, which can be represented by the formulas:

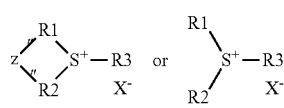

wherein R1, R2, and R3 are each independently selected from aromatic groups having from about 4 to about 20 carbon atoms (for example, substituted or unsubstituted phenyl, naphthyl, thienyl, and furanyl, where substitution can be with such groups as alkoxy, alkylthio, arylthio, halogen, and so forth) and alkyl groups having from 1 to about 20 carbon atoms. As used here, the term "alkyl" includes substituted alkyl (for example, substituted with such groups as halogen, hydroxy, alkoxy, or aryl). At least one of R1, R2, and R3 is aromatic, and, preferably, each is independently aromatic. Z is selected from the group consisting of a covalent bond, oxygen, sulfur, —S(=O)—, —C(=O)—, —(O=)S (=O)—, and —N(R)—, where R is aryl (of about 6 to about 20 carbons, such as phenyl), acyl (of about 2 to about 20 carbons, such as acetyl, benzoyl, and so forth), a carbon-to-carbon bond, or -(R4-)C(—R5)-, where R4 and R5 are independently selected from the group consisting of hydrogen, alkyl groups having from 1 to about 4 carbon atoms, and alkenyl groups having from about 2 to about 4 carbon atoms. X— is an anion, as described below.

Suitable anions, X⁻, for the sulfonium salts (and for any of the other types of photoinitiators) include a variety of anion types such as, for example, imide, methide, boron-centered, phosphorous-centered, antimony-centered, arsenic-centered, and aluminum-centered anions.

Illustrative, but not limiting, examples of suitable imide and methide anions include (C2F5SO2)2N—, (C4F9SO2)2N—, (C8F17SO2)3C—, (CF3SO2)3C—, (CF3SO2)2N—, (C4F9SO2)3C—, (CF3SO2)2(C4F9SO2)C—, (CF3SO2)(C4F9SO2)N—, ((CF3)2NC2F4SO2)2N—, (CF3)2NC2F4SO2C—(SO2 CF3)2, (3,5-bis(CF3)C6H3)SO2N—SO2CF3, C6H5SO2C—(SO2CF3)2, C6H5SO2N—SO2CF3, and the like. Preferred anions of this type include those represented by the formula $(R_fSO_2)_3C^-$, wherein $R_f$ is a perfluoroalkyl radical having from 1 to about 4 carbon atoms.

Illustrative, but not limiting, examples of suitable boron-centered anions include F4B⁻, (3,5-bis(CF3)C6H3)4B—, (C6F5)4B—, (p-CF3C6H4)4B—, (m-CF3C6H4)4B—, (p-FC6H4)4B—, (C6F5)3(CH3)B—, (C6F5)3(n-C4H9)B—, (p-CH3C6H4)3(C6F5)B—, (C6F5)3FB—, (C6H5)3(C6F5)B—, (CH3)2(p-CF3C6H4)2B—, (C6F5)3(n-C18H37O)B—, and the like. Preferred boron-centered anions generally contain 3 or more halogen-substituted aromatic hydrocarbon radicals attached to boron, with fluorine being the most preferred halogen. Illustrative, but not limiting, examples of the preferred anions include (3,5-bis(CF3)C6H3)4B—, (C6F5)4B—, (C6F5)3(n-C4H9)B—, (C6F5)3FB—, and (C6F5)3(CH3)B—.

Suitable anions containing other metal or metalloid centers include, for example, (3,5-bis(CF3)C6H3)4Al—, (C6F5)4Al—, (C6F5)2F4P—, (C6F5)F5P—, F6P⁻, (C6F5)F5Sb⁻, F6Sb⁻, (HO)F5Sb⁻, and F6As⁻. The foregoing lists are not intended to be exhaustive, as other useful boron-centered normucleophilic salts, as well as other useful anions containing other metals or metalloids, will be readily apparent (from the foregoing general formulas) to those skilled in the art.

Preferably, the anion, X⁻, is selected from tetrafluoroborate, hexafluorophosphate, hexafluoroarsenate, hexafluoroantimonate, and hydroxypentafluoroantimonate (for example, for use with cationically-reactive species such as epoxy resins).

Examples of suitable sulfonium salt photoinitiators include:
triphenylsulfonium tetrafluoroborate
methyldiphenylsulfonium tetrafluoroborate
dimethylphenylsulfonium hexafluorophosphate
triphenylsulfonium hexafluorophosphate
triphenylsulfonium hexafluoroantimonate
diphenylnaphthylsulfonium hexafluoroarsenate
tritolysulfonium hexafluorophosphate
anisyldiphenylsulfonium hexafluoroantimonate
4-butoxyphenyldiphenylsulfonium tetrafluoroborate
4-chlorophenyldiphenylsulfonium hexafluorophosphate
tri(4-phenoxyphenyl)sulfonium hexafluorophosphate
di(4-ethoxyphenyl)methylsulfonium hexafluoroarsenate
4-acetonylphenyldiphenylsulfonium tetrafluoroborate
4-thiomethoxyphenyldiphenylsulfonium hexafluorophosphate di(methoxysulfonylphenyl)methylsulfonium hexafluoroantimonate
di(nitrophenyl)phenylsulfonium hexafluoroantimonate
di(carbomethoxyphenyl)methylsulfonium hexafluorophosphate
4-acetamidophenyldiphenylsulfonium tetrafluoroborate
dimethylnaphthylsulfonium hexafluorophosphate
trifluoromethyldiphenylsulfonium tetrafluoroborate
p-(phenylthiophenyl)diphenylsulfonium hexafluoroantimonate
10-methylphenoxathiinium hexafluorophosphate
5-methylthianthrenium hexafluorophosphate
10-phenyl-9,9-dimethylthioxanthenium hexafluorophosphate
10-phenyl-9-oxothioxanthenium tetrafluoroborate
5-methyl-10-oxothianthrenium tetrafluoroborate
5-methyl-10,10-dioxothianthrenium hexafluorophosphate Preferred sulfonium salts include triaryl-substituted salts such as triarylsulfonium hexafluoroantimonate (for example, SarCat™ SR1010 available from Sartomer Company), triarylsulfonium hexafluorophosphate (for example, SarCat™ SR 1011 available from Sartomer Company), and triarylsulfonium hexafluorophosphate (for example, SarCat™ KI85 available from Sartomer Company).

Preferred photoinitiators include iodonium salts (more preferably, aryliodonium salts), sulfonium salts, and mixtures thereof. More preferred are aryliodonium salts and mixtures thereof.

Preparation of Photoreactive Composition

The reactive species, multiphoton photosensitizers, electron donor compounds, and photoinitiators can be prepared by the methods described above or by other methods known in the art, and many are commercially available. These four components can be combined under "safe light" conditions using any order and manner of combination (optionally, with stirring or agitation), although it is sometimes preferable (from a shelf life and thermal stability standpoint) to add the photoinitiator last (and after any heating step that is optionally used to facilitate dissolution of other components). Solvent can be used, if desired, provided that the solvent is chosen so as to not react appreciably with the components of the composition. Suitable solvents include, for example, acetone, dichloromethane, and acetonitrile. The reactive species itself can also sometimes serve as a solvent for the other components.

The three components of the photoinitiator system are present in photochemically effective amounts (as defined above). Generally, the composition can contain at least about 5% (preferably, at least about 10%; more preferably, at least about 20%) up to about 99.79% (preferably, up to about 95%; more preferably, up to about 80%) by weight of one or more reactive species; at least about 0.01% (preferably, at least about 0.1%; more preferably, at least about 0.2%) up to about 10% (preferably, up to about 5%; more preferably, up to about 2%) by weight of one or more photosensitizers; optionally, up to about 10% (preferably, up to about 5%) by weight of one or more electron donor compounds (preferably, at least about 0.1%; more preferably, from about 0.1% to about 5%); and from about 0.1% to about 10% by weight of one or more electron acceptor compounds (preferably, from about 0.1% to about 5%) based upon the total weight of solids (that is, the total weight of components other than solvent).

A wide variety of adjuvants can be included in the photoreactive compositions, depending upon the desired end use. Suitable adjuvants include solvents, diluents, resins, binders, plasticizers, pigments, dyes, inorganic or organic reinforcing or extending fillers (at preferred amounts of about 10% to 90% by weight based on the total weight of the composition), thixotropic agents, indicators, inhibitors, stabilizers, ultraviolet absorbers, and the like. The amounts and types of such adjuvants and their manner of addition to the compositions will be familiar to those skilled in the art.

It is within the scope of this invention to include nonreactive polymeric binders in the compositions in order, for example, to control viscosity and to provide film-forming properties. Such polymeric binders can generally be chosen to be compatible with the reactive species. For example, polymeric binders that are soluble in the same solvent that is used for the reactive species, and that are free of functional groups that can adversely affect the course of reaction of the reactive species, can be utilized. Binders can be of a molecular weight suitable to achieve desired film-forming properties and solution rheology (for example, molecular weights between about 5,000 and 1,000,000 Daltons; preferably between about 10,000 and 500,000 Daltons; more preferably, between about 15,000 and 250,000 Daltons). Suitable polymeric binders include, for example, polystyrene, poly(methyl methacrylate), poly(styrene)-co-(acrylonitrile), cellulose acetate butyrate, and the like.

Prior to exposure, the resulting photoreactive compositions can be coated on a substrate, if desired, by any of a variety of coating methods known to those skilled in the art (including, for example, knife coating and spin coating). The substrate can be chosen from a wide variety of films, sheets, and other surfaces (including silicon wafers and glass plates), depending upon the particular application and the method of exposure to be utilized. Preferred substrates are generally sufficiently flat to enable the preparation of a layer of photoreactive composition having a uniform thickness. For applications where coating is less desirable, the photoreactive compositions can alternatively be exposed in bulk form.

Exposure System and its Use

In carrying out the process of the invention, a photoreactive composition can be exposed to light under conditions such that multiphoton absorption occurs, thereby causing a region of differential solubility characteristics (for example, lesser or greater solubility in a particular solvent) as compared to the photoreactive composition prior to exposure. Such exposure can be accomplished by any known means capable of achieving sufficient intensity of the light.

Figure 6:
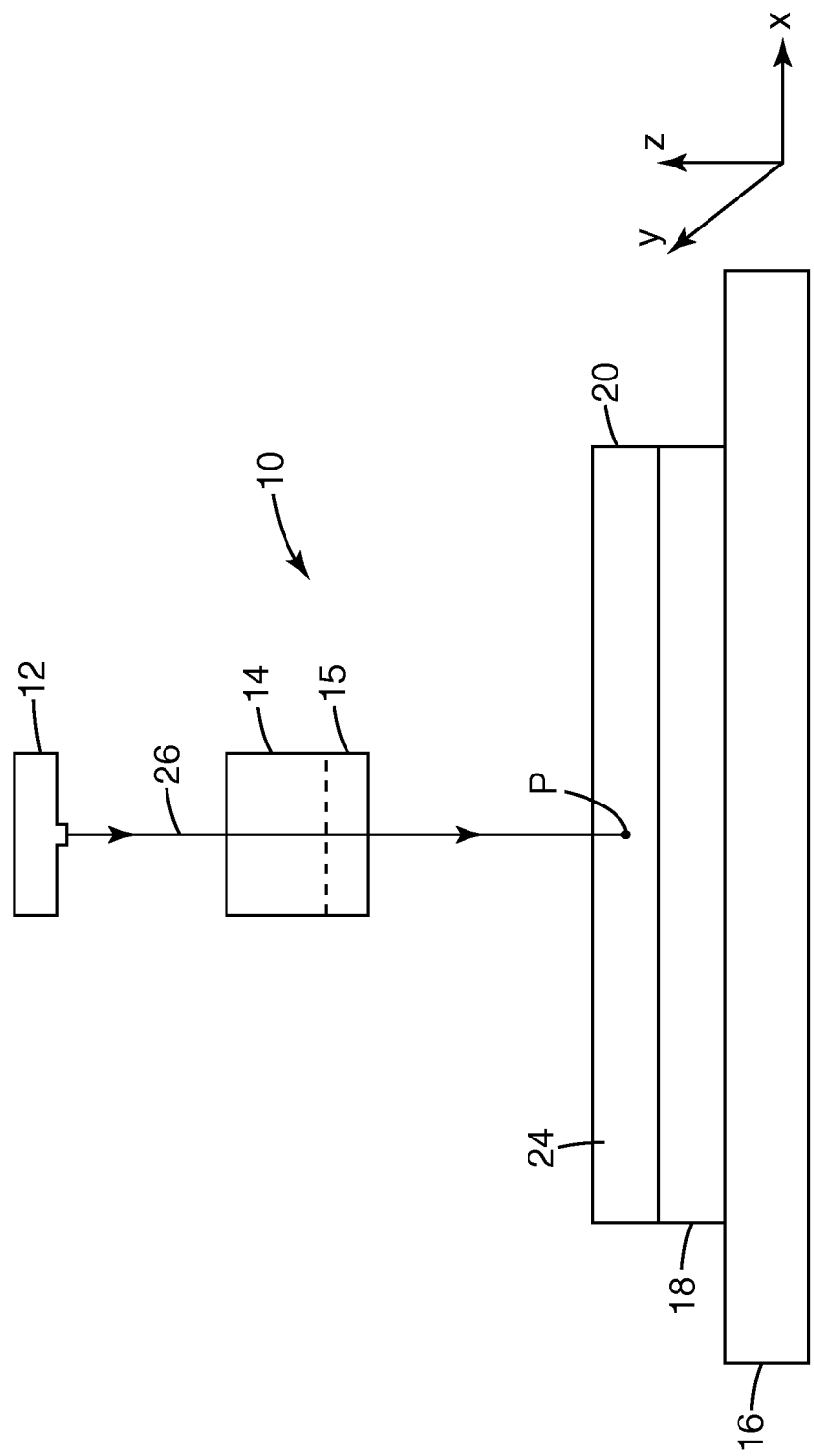
FIG. 6 is a diagram of an exposure system used in a photolithographic process to fabricate a master for making lightguides in accordance with embodiments of the invention.

One exemplary type of system that can be used is shown in FIG. 6. Referring to FIG. 1, fabrication system 10 includes light source 12, optical system 14 comprising a final optical element 15 (optionally including galvo-mirrors and a telescope to control beam divergence), and moveable stage 16. Stage 16 is moveable in one, two, or, more typically, three dimensions. Substrate 18 mounted on stage 16 has a layer 20 of photoreactive composition 24 thereon. Light beam 26 originating from light source 12 passes through optical system 14 and leaves through final optical element 15 which focuses it to a point P within layer 20, thereby controlling the three-dimensional spatial distribution of light intensity within the composition and causing at least a portion of photoreactive composition 24 in the vicinity of point P to become more, or less, soluble in at least one solvent than it was immediately prior to exposure to light beam 26.

By moving stage 16, or by directing light beam 26 (for example, moving a laser beam using galvo-mirrors and a telescope) in combination with moving one or more elements of optical system 14, the focal point P can be scanned or translated in a three-dimensional pattern that corresponds to a desired shape. The resulting reacted or partially reacted portion of photoreactive composition 24 then creates a three-dimensional structure of the desired shape. For example, in a single pass the surface profile (corresponding to a thickness of about one volume pixel or voxel) of one or more light extraction structures can be exposed or imaged, which upon development can form the surface of the structure(s).

The imagewise exposing of the surface profile can be carried out by scanning at least the perimeter of a planar slice of a desired three-dimensional structure and then scanning a plurality of preferably parallel, planar slices to complete the structure. Slice thickness can be controlled to achieve a sufficiently low level of surface roughness to provide optical quality light extraction structures. For example, smaller slice thicknesses can be desirable in regions of greater structure taper to aid in achieving high structure fidelity, but larger slice thicknesses can be utilized in regions of less structure taper to aid in maintaining useful fabrication times. In this way, a surface roughness less than the slice thickness (preferably, less than about one-half of the slice thickness; more preferably, less than about one-quarter of the slice thickness) can be achieved without sacrificing fabrication speed (throughput or number of structures fabricated per unit time).

When the photoreactive composition is coated on a substrate that exhibits a degree of non-planarity that is of the same or greater size magnitude as voxel height, it can be desirable to compensate for the non-planarity to avoid optically- or physically-defective structures. This can be accomplished by locating (for example, using a confocal interface locator system, interferometry, or fluorescence interface locator system) the position of the interface between the substrate and the portion of the photoreactive composition that is to be exposed, and then adjusting the location of the optical system 14 appropriately to focus light beam 26 at the interface. (Such a procedure is described in detail in a co-pending and co-filed patent application bearing 60/752,529, the description of which is incorporated herein by reference.) Preferably, this procedure can be followed for at least one structure out of every twenty structures in an array (more preferably, at least one out of every ten; most preferably, for each structure in the array).

Light source 12 can be any light source that produces sufficient light intensity to effect multiphoton absorption. Suitable sources include, for example, femtosecond near-infrared titanium sapphire oscillators (for example, those available from Coherent, Santa Clara, Calif., under the trade designation "MIRA OPTIMA 900-F") pumped by an argon ion laser (for example, those available from Coherent under the trade designation "INNOVA"). This laser, operating at 76 MHz, has a pulse width of less than 200 femtoseconds, is tunable between 700 and 980 nm, and has average power up to 1.4 Watts. Another useful laser is available from Spectra-Physics, Mountain View, Calif., under the trade designation "MAI TAI", tunable to wavelengths in a range of from 750 to 850 nanometers, and having a repetition frequency of 80 megahertz, and a pulse width of about 100 femtoseconds ($1\times10^{-13}$ sec), with an average power level up to 1 Watt.

However, any light source (for example, a laser) that provides sufficient intensity to effect multiphoton absorption at a wavelength appropriate for the multiphoton absorber used in the photoreactive composition can be utilized. Such wavelengths can generally be in the range of about 300 to about 1500 nm; preferably, from about 400 to about 1100 nm; more preferably, from about 600 to about 900 nm; more preferably, from about 750 to about 850 nm, inclusive. Typically, the light fluence (for example, peak intensity of a pulsed laser) is greater than about $10^6$ W/cm$^2$. The upper limit on the light fluence is generally dictated by the ablation threshold of the photoreactive composition. For example, Q-switched Nd:YAG lasers (for example, those available from Spectra-Physics under the trade designation "QUANTA-RAY PRO"), visible wavelength dye lasers (for example, those available from Spectra-Physics under the trade designation "SIRAH" pumped by a Q-switched Nd:YAG laser from Spectra-Physics having the trade designation "Quanta-Ray PRO"), and Q-switched diode pumped lasers (for example, those available from Spectra-Physics under the trade designation "FCBAR") can also be utilized.

Preferred light sources are near infrared pulsed lasers having a pulse length less than about $10^{-8}$ second (more preferably, less than about $10^{-9}$ second; most preferably, less than about $10^{-11}$ second). Other pulse lengths can be used as long as the peak intensity and ablation threshold criteria above are met. Pulsed radiation can, for example, have a pulse frequency of from about one kilohertz up to about 50 megahertz, or even more. Continuous wave lasers can also be used.

Optical system 14 can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing. Generally, combinations of optical elements can be utilized, and other appropriate combinations will be recognized by those skilled in the art. Final optical element 15 can include, for example, one or more refractive, reflective, and/or diffractive optical elements. In one embodiment, an objective such as, for example, those used in microscopy can be conveniently obtained from commercial sources such as, for example, Carl Zeiss, North America, Thornwood, N.Y., and used as final optical element 15. For example, fabrication system 10 can include a scanning confocal microscope (for example, those available from Bio-Rad Laboratories, Hercules, Calif., under the trade designation "MRC600") equipped with a 0.75 numerical aperture (NA) objective (such as, for example, those available from Carl Zeiss, North America under the trade designation "20×FLUAR").

It can often be desirable to use optics with relatively large numerical aperture to provide highly-focused light. However, any combination of optical elements that provides a desired intensity profile (and spatial placement thereof) can be utilized.

Exposure times generally depend upon the type of exposure system used to cause reaction of the reactive species in the photoreactive composition (and its accompanying variables such as numerical aperture, geometry of light intensity spatial distribution, the peak light intensity during the laser pulse (higher intensity and shorter pulse duration roughly correspond to peak light intensity)), as well as upon the nature of the photoreactive composition. Generally, higher peak light intensity in the regions of focus allows shorter exposure times, everything else being equal. Linear imaging or "writing" speeds generally can be about 5 to 100,000 microns/second using a laser pulse duration of about $10^{-8}$ to $10^{-15}$ second (for example, about $10^{-11}$ to $10^{-14}$ second) and about $10^2$ to $10^9$ pulses per second (for example, about $10^3$ to $10^8$ pulses per second).

In order to facilitate solvent development of the exposed photoreactive composition and obtain a fabricated light extraction structure, a threshold dose of light (that is, threshold dose) can be utilized. This threshold dose is typically process specific, and can depend on variables such as, for example, the wavelength, pulse frequency, intensity of the light, the specific photoreactive composition, the specific structure being fabricated, or the process used for solvent development. Thus, each set of process parameters can typically be characterized by a threshold dose. Higher doses of light than the threshold can be used, and can be beneficial, but higher doses (once above the threshold dose) can typically be used with a slower writing speed and/or higher light intensity.

Increasing the dose of light tends to increase the volume and aspect ratio of voxels generated by the process. Thus, in order to obtain voxels of low aspect ratio, it is generally preferable to use a light dose that is less than about 10 times the threshold dose, preferably less than about 4 times the threshold dose, and more preferably less than about 3 times the threshold dose. In order to obtain voxels of low aspect ratio, the radial intensity profile of light beam 26 is preferably Gaussian.

Through multiphoton absorption, light beam 26 induces a reaction in the photoreactive composition that produces a volume region of material having solubility characteristics different from those of the unexposed photoreactive composition. The resulting pattern of differential solubility can then be realized by a conventional development process, for example, by removing either exposed or unexposed regions.

The exposed photoreactive composition can be developed, for example, by placing the exposed photoreactive composition into solvent to dissolve regions of higher solvent solubility, by rinsing with solvent, by evaporation, by oxygen plasma etching, by other known methods, and by combinations thereof. Solvents that can be used for developing the exposed photoreactive composition include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof.

An optional bake after exposure to light under multiphoton absorption conditions, but prior to solvent development, can be useful for some photoreactive compositions such as, for example, epoxy-type reactive species. Typical bake conditions include temperatures in a range of from about 40° C. to about 200° C., for times in a range of from about 0.5 minutes to about 20 minutes.

Optionally, after exposure of only the surface profile of a light extraction structure array, preferably followed by solvent development, a nonimagewise exposure using actinic radiation can be carried out to effect reaction of the remaining unreacted photoreactive composition. Such a nonimagewise exposure can preferably be carried out by using a one-photon process.

Complex three-dimensional light extraction structures and light extraction structure arrays can be prepared in this manner.

Figure 7:
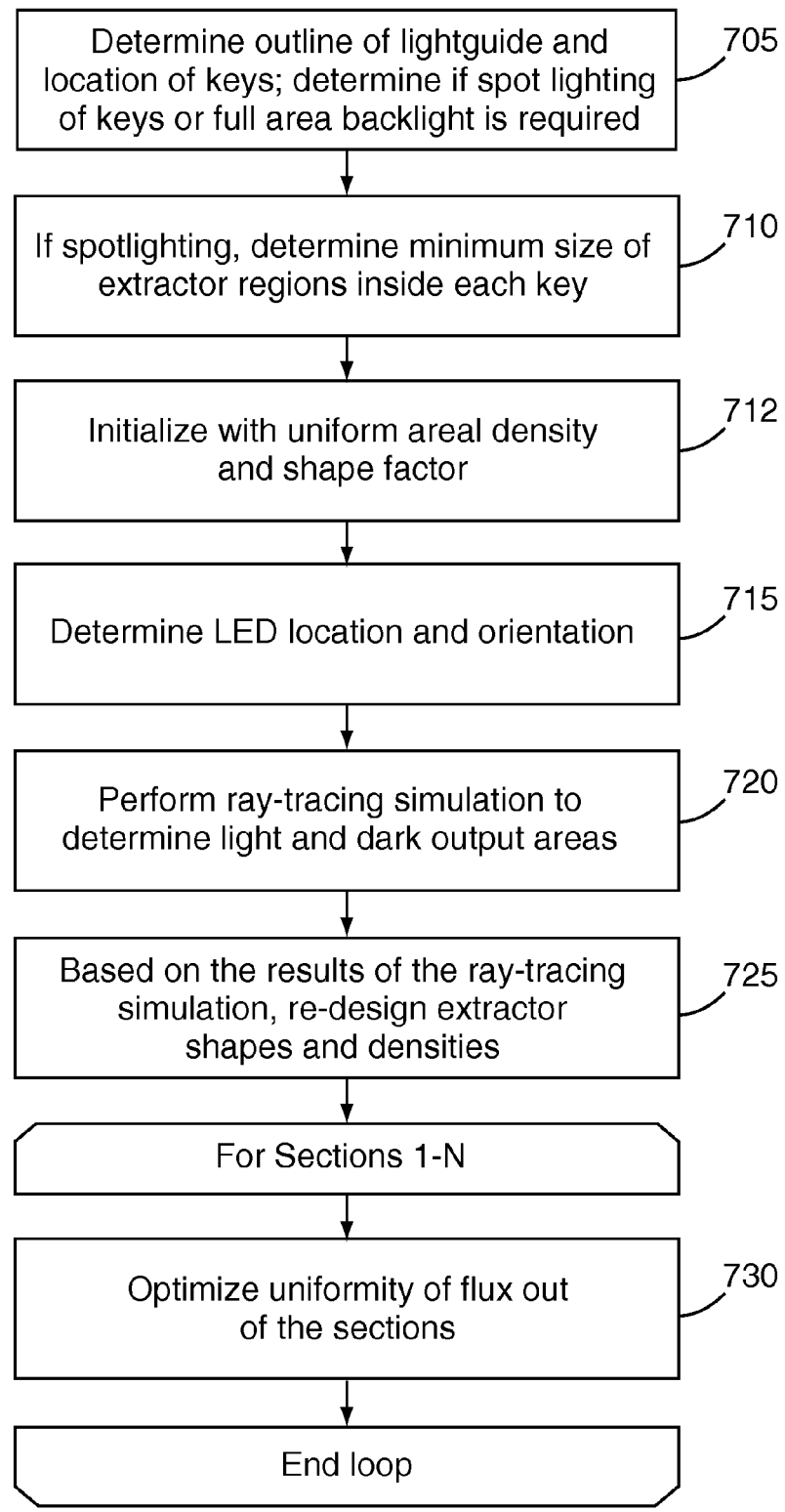
FIG. 7 is a flow diagram of a process for designing a lightguide in accordance with embodiments of the invention.

Design of a lightguide for a particular device configuration, such as a keypad, may be achieved using simulations to determine optimal values for light extractors to achieve a desired level of uniformity for light output. FIG. 7 is a flow diagram illustrating a process for designing a light extractor pattern for a keypad. The outline of the lightguide and location of the keys is determined 705. It is determined if spot lighting of the keys or full area backlight is required. If spot lighting is required, the minimum size of the extractors in each key region is determined 710. An initialization simulation is performed 712 using identical extractors (constant areal density and shape factor) in all regions. An extractor shape and density is selected for the test run that is close to the mean of similar previous models. Based on design requirements, the best lamp location and lamp orientation is determined 715.

Ray-tracing is performed 720 to identify light and dark output areas. Based on the ray-tracing simulation, the extractor regions, extractor shapes and initial extractor densities are redesigned 725. The uniformity of flux is optimized 730 section by section for each section in the lightguide beginning with the section closest to the light source and proceeding towards the sections farthest from the light source.

The above process provides an initial optimization. If the extractor shape, size, and/or density was poorly chosen in the initial optimization, a new initial choice may be made and the optimization re-run. If the initial optimization yields flux uniformity that is close to the requirements, parameters for individual extractors, or groups of extractors are adjusted, running simulations after each change, until all keys have output flux within specifications.

The foregoing description of the various embodiments of the invention has been presented for the purposes of illustration and description. It is not region intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A lightguide, comprising light extractors arranged in a pattern on a surface of the lightguide, the pattern configured to enhance uniformity of light output across a surface of the lightguide and wherein an areal density of the light extractors varies inversely with extraction efficiency of the light extractors.

2. The lightguide of claim 1, wherein the fill factor of the light extractors is above a minimum fill factor that prevents a viewer from resolving individual light extractors.

3. The lightguide of claim 1, wherein the light extractors are recessed structures.

4. The lightguide of claim 1, wherein the lightguide is monolithic.

5. The lightguide of claim 1, wherein the extraction efficiency of the light extractors varies as a function of height or shape or both of the light extractors.

6. The lightguide of claim 1, wherein the light extractors are arranged to enhance the uniformity of light output over a continuous surface of the lightguide.

7. The lightguide of claim 1, wherein the light extractors are arranged to enhance the uniformity of light output in discrete regions of the lightguide.

8. The lightguide of claim 7, wherein the discrete regions are configured to illuminate keys of a keypad.

9. The lightguide of claim 1, wherein the light extractors are truncated aspheres.

10. The lightguide of claim 1, wherein the light extractors are one or more of hemispheres, truncated hemispheres, cones, and truncated cones.

11. A backlight, comprising:
a light source configured to generate light; and
a lightguide, comprising light extractors arranged in a pattern on a surface of the lightguide, the pattern configured to enhance uniformity of light output across a surface of the lightguide, wherein an areal density of the light extractors decreases as illumination from the light source decreases.

12. The backlight of claim 11, wherein the fill factor of the light extractors is above a minimum fill factor that prevents a viewer from resolving individual light extractors.

13. The backlight of claim 11, wherein the light extractors are recessed structures.

14. The backlight of claim 11, wherein the lightguide is monolithic.

15. The backlight of claim 11, wherein the extraction efficiency of the light extractors varies as a function of height or shape or both of the light extractors.

16. The backlight of claim 11, wherein the light extractors are truncated aspheres.

17. The backlight of claim 11, wherein the light extractors are one or more of cones and truncated cones.

18. The backlight of claim 11, wherein the areal density of the light extractors is substantially constant or decreases in a direction of propagation of light from the light source.

19. The backlight of claim 11, further comprising:
- a first area of the lightguide having relatively higher illumination from the light source;
- a second area of the lightguide having relatively lower illumination from the light source, the light extractors in the first area having substantially equal or greater areal density than the light extractors in the second area.

* * * * *

UNITED STATES PATENT AND TRADEMARK OFFICE
CERTIFICATE OF CORRECTION

PATENT NO. : 8,545,037 B2
APPLICATION NO. : 13/669990
DATED : October 1, 2013
INVENTOR(S) : David A Ender Page 1 of 1

It is certified that error appears in the above-identified patent and that said Letters Patent is hereby corrected as shown below:

In the Specification

Column 14
Line 63, Delete "(3H)" and insert -- 1(3H) --, therefor.

Column 15-16
Line 34, Delete

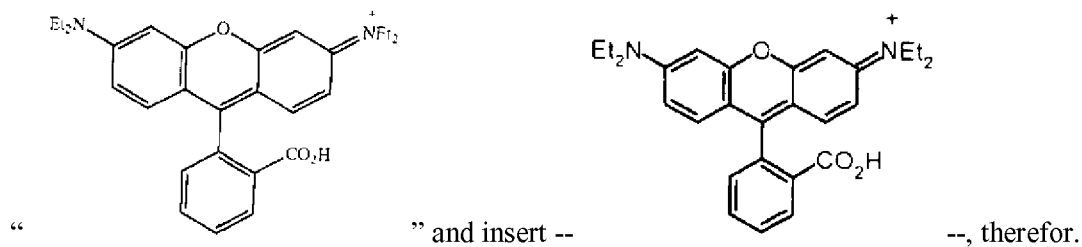

" and insert -- -- , therefor.

Column 22
Line 43, Delete "normucleophilic" and insert -- nonnucleophilic --, therefor.

Signed and Sealed this
Twenty-ninth Day of April, 2014

Michelle K. Lee
*Deputy Director of the United States Patent and Trademark Office*